(12) United States Patent
Lussier

(10) Patent No.: US 9,523,868 B2
(45) Date of Patent: *Dec. 20, 2016

(54) COLOR CHANGING MATERIALS ARRANGED IN SLOW PARTICLE COLORATION MATERIALS

(71) Applicant: adidas AG, Herzogenaurach (DE)

(72) Inventor: Michel Reginald Pierre Joseph Lussier, Portland, OR (US)

(73) Assignee: adidas AG, Herzogenaurach (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/928,376

(22) Filed: Oct. 30, 2015

(65) Prior Publication Data

US 2016/0054595 A1      Feb. 25, 2016

Related U.S. Application Data

(63) Continuation of application No. 14/222,721, filed on Mar. 24, 2014, now Pat. No. 9,213,191.

(51) Int. Cl.
*G02F 1/09* (2006.01)
*G02F 1/01* (2006.01)
(Continued)

(52) U.S. Cl.
CPC .......... *G02F 1/0131* (2013.01); *B01J 13/0047* (2013.01); *G02B 1/005* (2013.01);
(Continued)

(58) Field of Classification Search
CPC ............. G02B 1/00; G02B 1/005; G02F 1/09; G02F 1/092; G02F 2001/094; G02F 2202/32
See application file for complete search history.

(56) References Cited

U.S. PATENT DOCUMENTS

| 4,721,274 A | 1/1988 | Erb |
| 6,022,619 A | 2/2000 | Kuhn et al. |

(Continued)

FOREIGN PATENT DOCUMENTS

| EP | 2253355 | 11/2010 |
| WO | 2009017525 | 2/2009 |

(Continued)

OTHER PUBLICATIONS

U.S. Appl. No. 14/222,712, Notice of Allowance mailed Jul. 8, 2015, 13 pages.

(Continued)

*Primary Examiner* — Joseph P Martinez
(74) *Attorney, Agent, or Firm* — Kilpatrick Townsend & Stockton LLP

(57) ABSTRACT

Articles comprises iron oxide colloidal nanocrystals arranged within chains, wherein the chains of nanocrystals are embedded within a material used to form the article or a transfer medium used to transfer a color to the article are described. The material or transfer medium includes elastic properties that allow the nanocrystals to display a temporary color determined by the strength of an external force applied to the article, and the material or transfer medium includes memory properties that cause the displayed temporary color to dissipate when the external force is removed, wherein the dissipation of the displayed temporary color is sufficiently slow as to be visually observable by an average observer's unaided eye.

18 Claims, 27 Drawing Sheets

(51) Int. Cl.
*G02B 1/00* (2006.01)
*B01J 13/00* (2006.01)
*B82Y 20/00* (2011.01)

(52) U.S. Cl.
CPC ............ *G02F 1/0128* (2013.01); *G02F 1/092* (2013.01); *B82Y 20/00* (2013.01); *G02F 2202/32* (2013.01); *Y10S 977/81* (2013.01); *Y10S 977/811* (2013.01); *Y10S 977/834* (2013.01); *Y10S 977/838* (2013.01)

(56) References Cited

U.S. PATENT DOCUMENTS

| | | | |
|---|---|---|---|
| 8,200,323 | B2 | 6/2012 | DiBenedetto et al. |
| 8,769,836 | B2 | 7/2014 | Donovan et al. |
| 9,213,191 | B2 * | 12/2015 | Lussier ................ G02F 1/0131 |
| 9,213,192 | B2 | 12/2015 | Lussier |
| 2002/0091011 | A1 | 7/2002 | Sosin et al. |
| 2008/0185498 | A1 | 8/2008 | Purdy et al. |
| 2010/0224823 | A1 * | 9/2010 | Yin ........................ B82Y 30/00 252/62.56 |
| 2010/0289971 | A1 | 11/2010 | Odland et al. |
| 2011/0099680 | A1 | 5/2011 | Gordon et al. |
| 2012/0028834 | A1 | 2/2012 | Kwon et al. |
| 2012/0061609 | A1 | 3/2012 | Yin et al. |
| 2012/0064309 | A1 | 3/2012 | Kwon et al. |
| 2012/0326104 | A1 | 12/2012 | Kwon et al. |
| 2013/0222889 | A1 | 8/2013 | Stroeve et al. |
| 2015/0266246 | A1 | 9/2015 | Lussier |
| 2015/0268381 | A1 | 9/2015 | Lussier |
| 2015/0268485 | A1 | 9/2015 | Lussier |
| 2015/0268487 | A1 | 9/2015 | Lussier |
| 2015/0268488 | A1 | 9/2015 | Lussier |
| 2016/0048042 | A1 | 2/2016 | Lussier |

FOREIGN PATENT DOCUMENTS

| | | |
|---|---|---|
| WO | 2010096203 | 8/2010 |
| WO | 2010120080 | 10/2010 |
| WO | 2010120108 | 10/2010 |
| WO | 2010120109 | 10/2010 |
| WO | 2010120361 | 10/2010 |
| WO | 2011019961 | 2/2011 |
| WO | 2011126575 | 10/2011 |
| WO | 2012023991 | 2/2012 |
| WO | 2012051258 | 4/2012 |
| WO | 2012122216 | 9/2012 |
| WO | 2013006207 | 1/2013 |
| WO | 2013112224 | 8/2013 |

OTHER PUBLICATIONS

U.S. Appl. No. 14/222,721, Notice of Allowance mailed Jul. 8, 2015, 9 pages.

Corr et al., "Multifunctional Magnetic-fluorescent Nanocomposites for Biomedical Applications", Nanoscale Research Letters, 2008, 87-104.

European Patent Application No. 15157782.2, European Search Report mailed Sep. 4, 2015, 9 pages.

European Patent Application No. 15157783.0, European Search Report mailed Aug. 27, 2016, 8 pages.

European Patent Application No. 15157784.8, European Search Report mailed Sep. 7, 2015, 5 pages.

European Patent Application No. 15157787.1, European Search Report mailed Sep. 1, 2015, 6 pages.

European Patent Application No. 15157788.9, Search Report mailed Sep. 3, 2015, 9 pages.

Ge et al., "Highly Tunable Superparamegnetic Colloidal Photonic Crystals", Angewandte Chemi International Edition, Wiley—V C H Verlag GMBH & Co., KGAA, DE, vol. 49, No. 39, Oct. 1, 2007, pp. 7428-7431.

Kim et al., "Structural Colour Printing Using a Magnetically Tunable and Lithographically Fixable Photonic Crystal", Nature Photonics, Sep. 2009, 534-540.

Pascu , "Surface Reactivity of Iron Oxide Nanoparticles by Microwave-Assisted Synthesis: Comparison with the Thermam Decomposition Route", Journal of Physical Chemistry C, vol. 116, No. 28, Jul. 19, 2012, pp. 15108-15116.

Xu et al., "Synthesis and Utilization of Monodisperse Superparamagnetic Colloidal Particles for Magnetically Controllable Phototonic Crystals", Chemistry of Materials, American Chemical Society, US, vol. 14, No. 3, Mar. 18, 2002, pp. 1249-1256.

Yin , "Magnetically Responsive Photonic Nanostructures", SPIE, 2011, pp. 1-2.

* cited by examiner

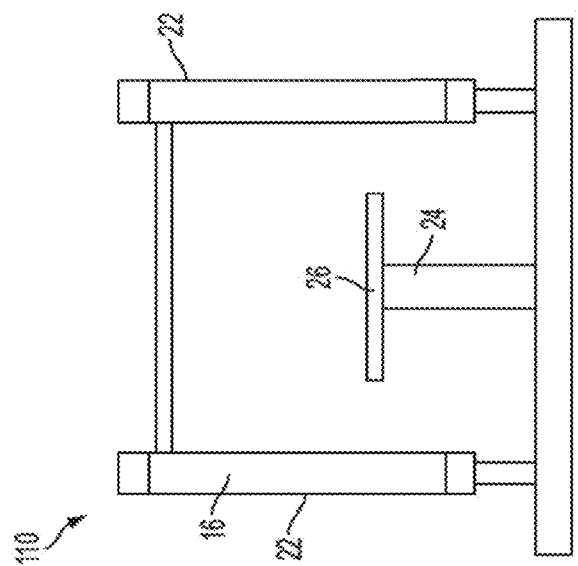
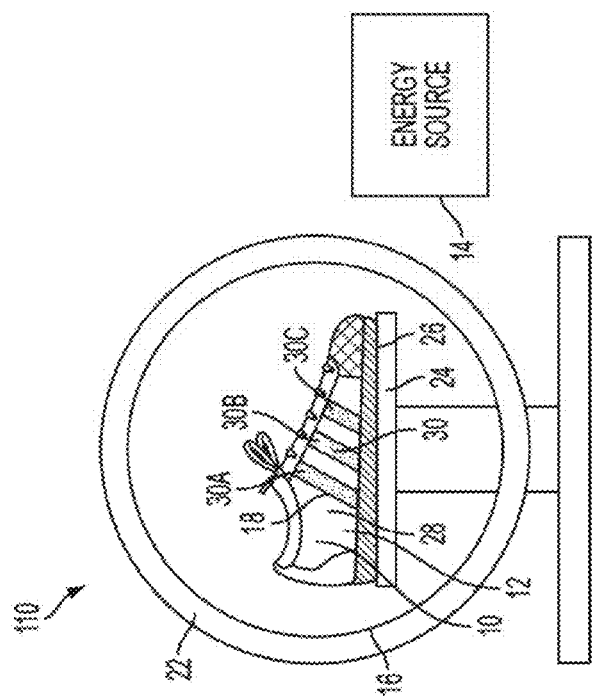
FIG. 5B
FIG. 5A

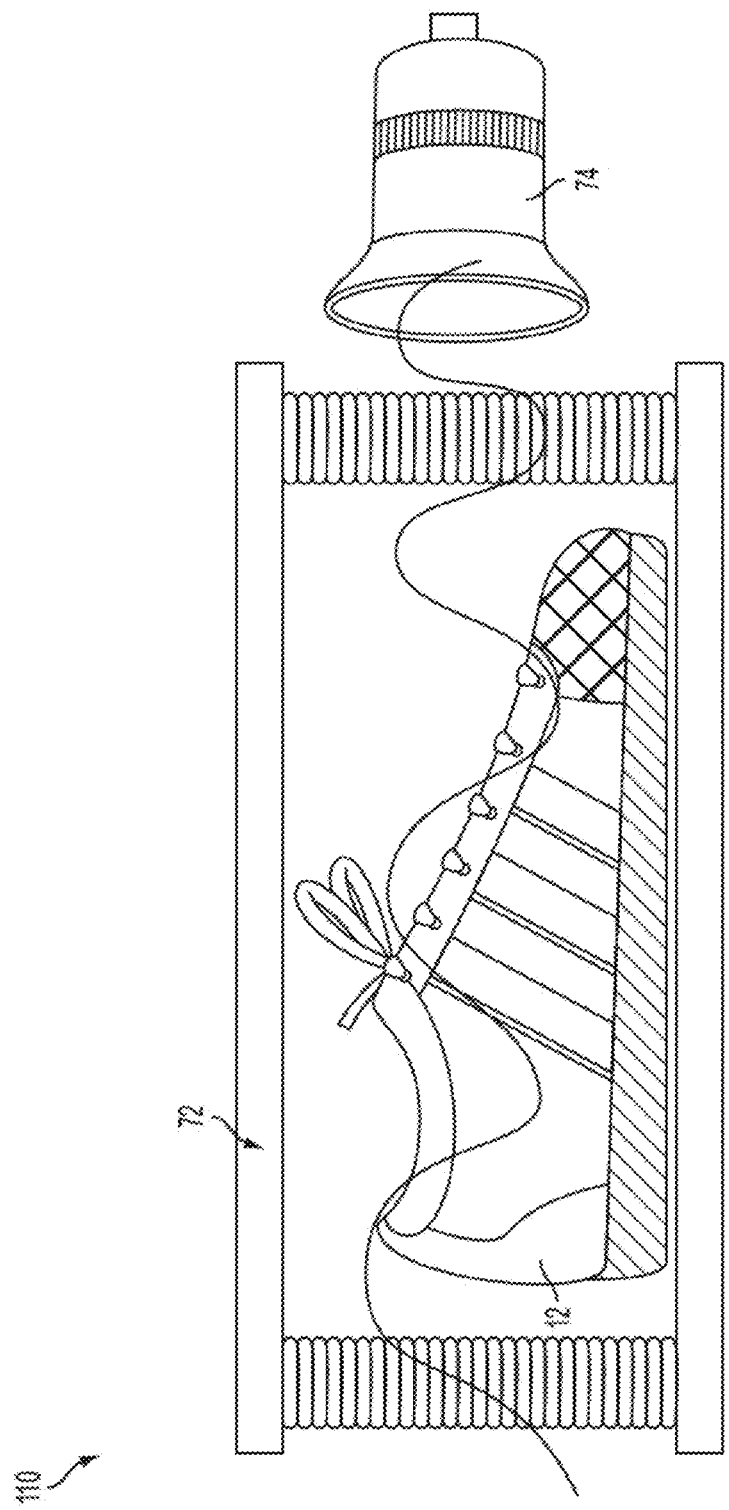

COLOR CHANGING MATERIALS ARRANGED IN SLOW PARTICLE COLORATION MATERIALS

CROSS REFERENCE TO RELATED APPLICATIONS

This is a continuation of U.S. patent application Ser. No. 14/222,721 entitled "Color Changing Materials Arranged in Slow Particle Coloration Materials" filed Mar. 24, 2014 (allowed), the contents of which are incorporated herein by reference.

FIELD OF THE INVENTION

The present invention relates to business methods, footwear, apparel, and machines that incorporate materials that change color in response to a charge applied to one or more layers of material.

BACKGROUND

There have been a number of publications relating to the development of color changing materials. Photonic crystals are peculiar structures that show periodic variations in refractive index on a length scale comparable to the wavelength of light. This periodicity means that, for certain ranges of energies and wave vectors, light is not allowed to propagate through the medium. Such disallowed groups of wavelengths are called photonic band gaps. The coloration thereby imparted to photonic structures is called structural color, since it is not due to the presence of a dye or pigment, but rather to the conformation of the material itself. Photonic crystals are found in nature, e.g. in beetle scales, butterfly wings and parrot feathers, and can also be fabricated using a wide range of techniques.

In recent years, it has been discovered that subjecting a liquid suspension of iron oxide colloidal nanocrystal clusters ("CNCs") to a magnetic field causes the CNCs to assemble into periodic arrays that form a photonic crystal, which diffracts light in the visible spectrum, as well as in the ultraviolet and infrared spectrums. Adjusting the strength of the magnetic field applied to the CNCs alters the photonic crystal structure and hence the wavelength (color) of the diffracted light. In other words, the color displayed by the CNCs may be controlled by altering the strength of a magnetic field applied to a suspension containing the CNCs.

One of the earliest publications describing the development of particles that have color-changing attributes is WO2009/017525, which describes development of superparamagnetic magnetite ($Fe_3O_4$) CNCs. Polyacrylic acid is used as a surfactant for the strong coordination of carboxylate groups with iron cations on the magnetite surface. WO2009/017525 also teaches a method for constructing colloidal photonic crystals out of the polyacrylate capped superparamagnetic magnetite CNCs. The colloidal photonic crystals show highly tunable diffractions covering the whole visible region owing to the highly charged polyacrylate covered surfaces and the strong magnetic responses of the magnetite CNCs. These magnetite CNCs readily self-assemble into colloidal photonic crystals in polar solvents (such as water and alkanols) upon application of a magnetic field. The optical responses of the photonic crystals are rapid and fully reversible.

WO2010/096203 teaches a method of assembling superparamagnetic CNCs into colloidal photonic crystals in nonpolar solvents by establishing long-range electrostatic repulsive forces on the CNCs using charge control agents. The method includes coating the CNCs with a hydrophobic coating so that the CNCs are soluble in a nonpolar solvent solution, and adding a surfactant (charge control agent) to the nonpolar solvent solution, wherein the surfactant enhances charge separation between the CNCs to form an ordered structure with tunable particle separation.

WO2012/051258 describes a method of forming photonic crystals that diffract light to create color by dispersing solid particles within a magnetic liquid media, and magnetically organizing the solid particles within the magnetic liquid media into colloidal photonic crystal structures. The solid particles are non-magnetic, and the magnetic liquid media is magnetic nanoparticle-based ferrofluid, which is prepared by dispersing magnetic nanoparticles of transition metal and metal oxides in a liquid medium. The ferrofluid may be created in a polar or nonpolar solvent.

WO2013/006207 describes a method of producing multifunctional composite particles by direct self-assembly of hydrophobic nanoparticles on host nanostructures containing high density surface thiol groups. Hydrophobic nanoparticles of various compositions and combinations can be directly assembled onto the host surface through the strong coordination interactions between metal cations and thiol groups. The resulting structures can be further overcoated with a layer of normal silica to stabilize the assemblies and render them highly dispersible in water.

WO2010/120361 teaches a method wherein CNCs are coated in shells of other suitable mediums, such as silica, titania (titanium oxide), and/or polymers such as polystyrene and polymethylmethacrylate, in which the coating provides a means to obtain good dispersibility and promote solvation repulsion in a photocurable solution or resin. The coated CNCs are then dispersed in the photocurable solution or resin, after which the photocurable solution or resin containing the CNCs is placed in an immiscible solution (such as an oil) to form an emulsion. The emulsion is exposed to an external magnetic field to align the coated CNCs in one-dimensional chains within emulsion droplets within the photocurable solution or resin, and the emulsion droplets are cured within the photocurable solution or resin into magnetochromatic microspheres so that the color displayed by the CNCs is fixed when the magnetic field is removed. The magnetochromatic composition may be used for a color display, signage, bio and chemical detection and/or magnetic field sensing.

WO2013/112224 teaches a method of stabilizing electromagnetically charged particles, which includes coating electromagnetically charged particles with a protective layer and etching the protective layer with silica to produce a porous protective layer.

WO2012/122216 describes a method of fabricating individually fixed nanochains with a magnetically responsive photonic property, wherein CNCs are coated with a layer of silica, a magnetic field is applied to the CNCs to assemble the CNCs into photonic chains, and the photonic chains are then overcoated with an additional layer of silica. The particle chains are then permanently fixed by the silica overcoating so that they remain stable when dispersed in solution or dried on solid substrates.

WO2012/023991 describes a device for tuning bistable materials, such as a polymer or other media/medium containing CNCs. In certain embodiments, the tuning device transfers energy to the CNCs, which in turn locally softens or melts the thermally reversible polymer immediately surrounding each CNC, thus allowing the CNCs to reorient locally within the polymer when a magnetic field is applied for tuning of the color displayed by the bistable material. In other embodiments, an ionizing radiation (IR) device may be used in place of heat.

WO2011/126575 describes a color changeable artificial nail, in which the nail is formed of a bistable material, such as a cholsteric liquid crystal layer, that is adapted to change color in response to the application of an electrical charge.

While these publications describe how to form colloidal photonic crystals from CNCs suspended in polar and non-polar liquid solvents, how to magnetically organize non-magnetic solid particles within a ferrofluid containing CNCs, how to incorporate CNCs onto a host surface, how to permanently fix the color displayed by the CNCs in a UV curable resin or by application of a silica overcoating, as well as how to reversibly fix the color displayed by the CNCs in a bistable medium, there still remains a need for a method of incorporating CNCs into or applying CNCs to materials for use in the manufacture of apparel, footwear, sports equipment, and accessories, and fixing the color displayed by the CNCs (reversibly or permanently) so that the color does not change when the magnetic field is removed.

Furthermore, there are limitations in the current technologies available for manufacturing articles with details of a different color than the background. For example, two-tone colors in fabrics are typically accomplished through either sublimation of the color pattern onto a substrate or woven into the base fabric with two different colored yarns. While sublimation may produce vivid colors, it is difficult to reproduce sharp lines with this process when the details are less than 3 mm in thickness, such as the thickness of the chevrons in the jersey shown in FIGS. 1A and 1B. Thus, there is a further need to develop an improved process for manufacturing articles with details of a different color than the background.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an article comprises iron oxide colloidal nanocrystals arranged within chains, wherein the chains of nanocrystals are embedded within a material used to form the article or a transfer medium used to transfer a color to the article, wherein the material or transfer medium comprises elastic properties that allow the nanocrystals to display a temporary color determined by the strength of an external force applied to the article, and the material or transfer medium comprises memory properties that cause the displayed temporary color to dissipate when the external force is removed, wherein the dissipation of the displayed temporary color is sufficiently slow as to be visually observable by an average observer's unaided eye.

In some embodiments, the external force is application of a magnetic field to the chains of nanocrystals. In other embodiments, the external force is a physical force applied to the material or transfer medium, which cause a localized deformation of the material or transfer medium.

In some embodiments, the article is a club face of a golf club. In other embodiments, the article is one or more stretch membranes incorporated into an article of wear.

According to some embodiments, the color displayed by the one or more stretch membranes corresponds to an amount of force applied to the one or more stretch membranes.

BRIEF DESCRIPTION OF THE DRAWINGS

In the following detailed description, embodiments of the invention are described referring to the following figures:

FIG. 5A-5B are front and side views of a tuning device with a batch platform design with a different coil design, according to certain embodiments of the present invention.

FIG. 18 is a front view of a tuning device with a pulsating electromagnet design or a tuning device with a focused microwave activation design, according to certain embodiments of the present invention.

DETAILED DESCRIPTION

Figure 1A:
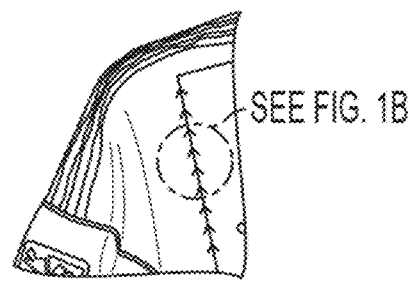
FIGS. 1A and 1B are a front partial view of a jersey and a close-up showing certain sharp lines in the jersey design.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

According to certain embodiments, the present invention comprises a method of tuning the color displayed by magnetite or iron oxide colloidal nanocrystals arranged within chains and incorporated within or attached to materials 10 for use in the manufacture of apparel, footwear, sports equipment, and accessories ("articles of wear 12") through application of a magnetic field, and fixing the color (reversibly or permanently) so that the color does not change when the magnetic field is removed.

In other embodiments, the nanocrystal chains may be incorporated within or otherwise directly combined with films, laminates, yarns, threads, fabrics, leathers, plastics, foams (EVA, TPU), etc. that form the materials 10 and/or the article of wear 12, without the need for a transfer medium. For example, the nanocrystal chains may be embedded within the polyurethane ("PU") topcoat of a PU coated leather and/or a PU synthetic leather.

In these embodiments, if the material 10 or article of wear 12 (such as films, laminates, yarns, threads, or similar solid materials) have properties that allow for localized softening or melting in areas immediately surrounding chains of nanocrystals, while maintaining the overall solid state of the material 10 or article of wear 12, the material 10 and/or the article of wear 12 may be initially manufactured in the absence of a magnetic field so that the color displayed by the nanocrystal chains in the material 10 and/or the article of wear 12 is the inherent color of the magnetite or iron oxide nanocrystals (a rust color). To adjust the color after manufacture through application of a tuning device 110 (as described in more detail below in the section describing "Machine Concepts"), the material 10 and/or the article of wear 12 is located within or adjacent the tuning device 110, an energy source 14 is applied to transfer energy to the nanocrystals within chains and embedded within the material 10 and/or the article of wear 12, which in turn locally softens or melts portions of the material 10 and/or the article of wear 12 immediately surrounding each chain of nanocrystals, which allows the nanocrystals within the chains to reorient locally within the material 10 and/or the article of wear 12 when a magnetic field is simultaneously applied by a magnetic field source 16 of the tuning device 110 to adjust the color displayed by the nanocrystal chains. The energy source 14 is then removed by the tuning device 110, which allows the material 10 and/or the article of wear 12 to harden or set, thus fixing the nanocrystals within chains in the new locations and thus fixing the color displayed by the chains of nanocrystals. In other embodiments, the magnetic field may be applied as the substrate is being applied to the material 10 and/or the article of wear 12 (if the material 10 and/or the article of wear 12 is suitably softened or melted to allow movement of the nanocrystals within the chains, while also being able to harden or set sufficiently quickly to fix the nanocrystals in place within the chains before the magnetic field is removed).

In other embodiments, where the nanocrystal chains cannot be incorporated into the material 10 and/or the article of wear 12 directly, the nanocrystal chains may be contained within a covering 18 that is adhered, welded, stitched, woven, knitted, or injected or otherwise applied with any other suitable means to the material 10 and/or the article of wear 12. For example, in certain embodiments, the covering 18 may be a topcoat, finish, or other coating material, or may be a fabric or other woven or non-woven material. In these embodiments, if the covering 18 has properties that allow for localized softening or melting in areas immediately surrounding the nanocrystal chains, then the material 10 and/or the article of wear 12 may be manufactured in the absence of a magnetic field so that the color displayed by the nanocrystal chains in the material 10 and/or the article of wear 12 is the inherent color of the magnetite or iron oxide nanocrystals (a rust color), and the color may be subsequently adjusted after manufacture through application of the tuning device 110, as described above and more detail below.

In other embodiments, the magnetic field may be applied as the covering 18 is being applied to the material 10 and/or the article of wear 12. For example, during application of the magnetic field, the covering 18 is suitably softened or melted to allow movement of the nanocrystals within the chains, while also being able to harden or set sufficiently quickly to fix the nanocrystals in place within the chains before the magnetic field is removed. In other examples, a rapidly fluctuating magnetic field is applied, which creates transient currents in the nanocrystal chains. The transient currents may lead to the softening or melting of the surrounding substrate. Once the softening or melting has been achieved, the magnetic field is then switched to a constant (non-fluctuating) field. In this embodiment, the magnetic field could be used as both an energy source and a particle spacer.

In some embodiments, the nanocrystal chains may be incorporated into a transfer medium 20, such as paint (spray or otherwise), dye, ink, film, gel, silicon, powder, or any other suitable medium that is conventionally used to transfer color to an object. In these embodiments, the chains of nanocrystals may remain in a dynamic state, i.e., the color displayed by the chains of nanocrystals is either the inherent color of the magnetite or iron oxide nanocrystals (a rust color) or the color displayed by the nanocrystal chains is adjustable by applying a magnetic field to the transfer medium 20, particularly in the case where the transfer medium 20 is in a liquid state. The transfer medium 20 is then applied to the materials 10. In certain embodiments, the transfer medium 20 is then cured to retain the activated color.

In embodiments where the nanocrystal chains are incorporated into a liquid or powder transfer medium 20, the transfer medium may be applied to the materials 10 via any suitable conventional method including but not limited to silk screening, painting, powder coating, submersion, injection, and sublimation. Such methods may be used to apply the transfer medium 20 to materials 10 such as yarns, threads, textiles, plastics, foams, leathers, etc.

Once the transfer medium 20 is dry, the tuning device 110 (as described in more detail below in the section describing "Machine Concepts") may be applied to achieve the desired color in the materials 10 and/or the article of wear 12. In these embodiments, the tuning device 110 comprises the energy source 14 (such as heat, UV radiation, or other radiation targeted at the nanocrystal chains) and the magnetic field source 16. When the materials 10 and/or the article of wear 12 are located within or adjacent the tuning device 110, the energy source 14 is applied to the nanocrystal chains within the transfer medium 20, which in turn locally softens or melts portions of the transfer medium 20 immediately surrounding the nanocrystal chains, which allows the nanocrystals to reorient locally within the chains and within the transfer medium 20 when a magnetic field is simultaneously applied to adjust the color displayed by the nanocrystal chains. The energy source 14 is then removed, which allows the transfer medium 20 to harden or set, thus fixing the nanocrystals in the new locations within the chains when the magnetic field is removed.

Figure 2:
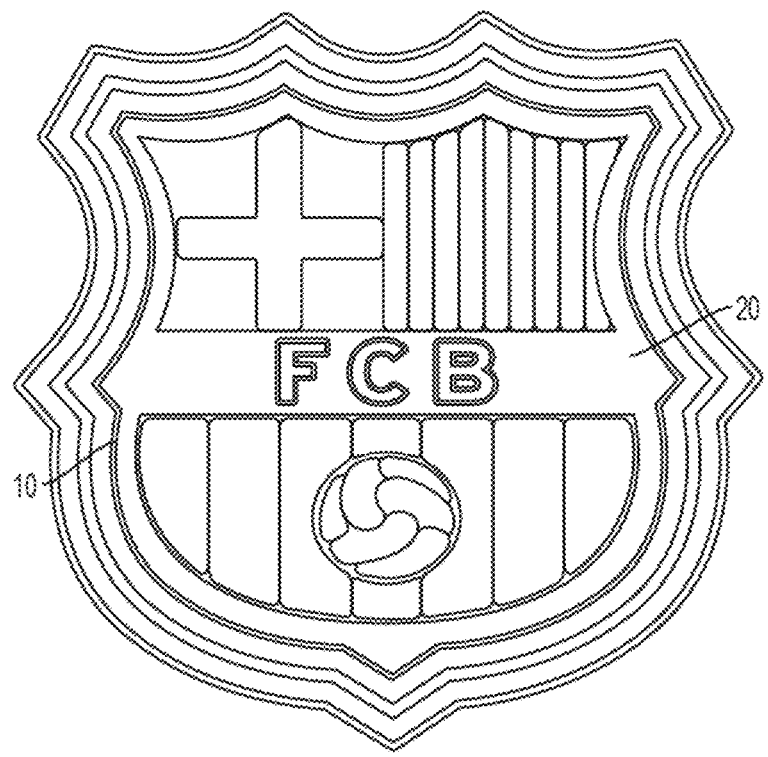
FIG. 2 is an image of a microinjected silicon patch with areas of multiple colors.

For example, as illustrated in FIG. 2, microinjected silicon patches 10 include areas of multiple colors, wherein each color is traditionally separately added to the decoration manually by injecting the silicon into a mold with a syringe. This is a labor intensive process that may be streamlined with silicon doped with nanocrystal chains. By injecting a single nanocrystal doped silicon, time is saved in the application stage and the intricate colors can be set in post processing, using any of the various techniques described above and in more detail below. This also reduces the various color stock of silicon that must be stored and also the number of syringes that would otherwise be needed when injecting multiple colors.

In certain embodiments, the process of rubber vulcanization requires heating and pressing rubber into a steel tool. Different colors are achieved by placing different colored rubbers into the steel tool and removing the excesses by scraping a "color dam" that separates adjacent areas. This is a long and expensive process because the rubbers needs to be prepared in several colors, pre-cut to shape and weight to fit the different colored areas of the steel tool, placed into the very hot steel tool, and scraped/cleaned to prevent bleeding of the colors. Using only one color of rubber, and then manipulating the color of the rubber during or after vulcanization using any of the various techniques described above and in more detail below, saves time and money.

In certain embodiments, the steel tools are magnetized with different gauss values based on the correlated magnetics properties, which creates different colors of rubber during the vulcanization process. The concept embodies the interaction of magnetic structures, each made up of geometric patterns of magnetic elements imprinted into the magnet surface. These magnetic structures feature designs of magnetic elements varying in polarity, field strength, size, shape, location, and dipole orientation.

In these embodiments, the rubber is created in one color and comprises the chains of nanocrystals in a dynamic state. The rubber is placed in the steel tool irrelevant of the colored areas. The magnetized state of the steel tool causes the nanocrystal chains to shift within the chains display a particular color related to the strength of the magnetic field, and the vulcanization process fixes the nanocrystals in the new location within the chains.

In other embodiments, the color displayed by the nanocrystal chains may be permanently fixed within the transfer medium 20 or covering 18 prior to applying the transfer medium 20 or covering 18 to the material 10 and/or the article of wear 12. In these embodiments, the transfer medium 20 or covering 18 may be simultaneously exposed to a magnetic field and energy. In some embodiments, the energy is applied to at least some of the chains of nanocrystals to soften the transfer medium or substrate immediately surrounding the chains of nanocrystals to which the energy is applied, although this softening step may not be required for certain types of materials used to form the transfer medium or substrate.

Once the strength of the magnetic field is adjusted to achieve the desired color displayed by the transfer medium 20 or covering 18, the energy source is applied at a level that destroys the coating or encapsulation surrounding the nanocrystal chains, which eliminates the ability of the nanocrystals to adjust position within the chains and within the transfer medium or substrate when a magnetic field is applied. As a result, the nanocrystal chains are locked into a permanent color prior to application to the material 10 and/or the article of wear 12.

This option eliminates the ability to further adjust the color displayed by the nanocrystal chains once they are applied to the material 10 and/or the article of wear 12, but provides an alternative to traditional pigments used in dyes, paints or other chemically-driven methods to alter color. The same process of permanently fixing the color displayed by the nanocrystal chains within the transfer medium or substrate could also occur after application to the material 10 and/or the article of wear 12.

Machine Concepts

Batch Platform Design

Figure 3:
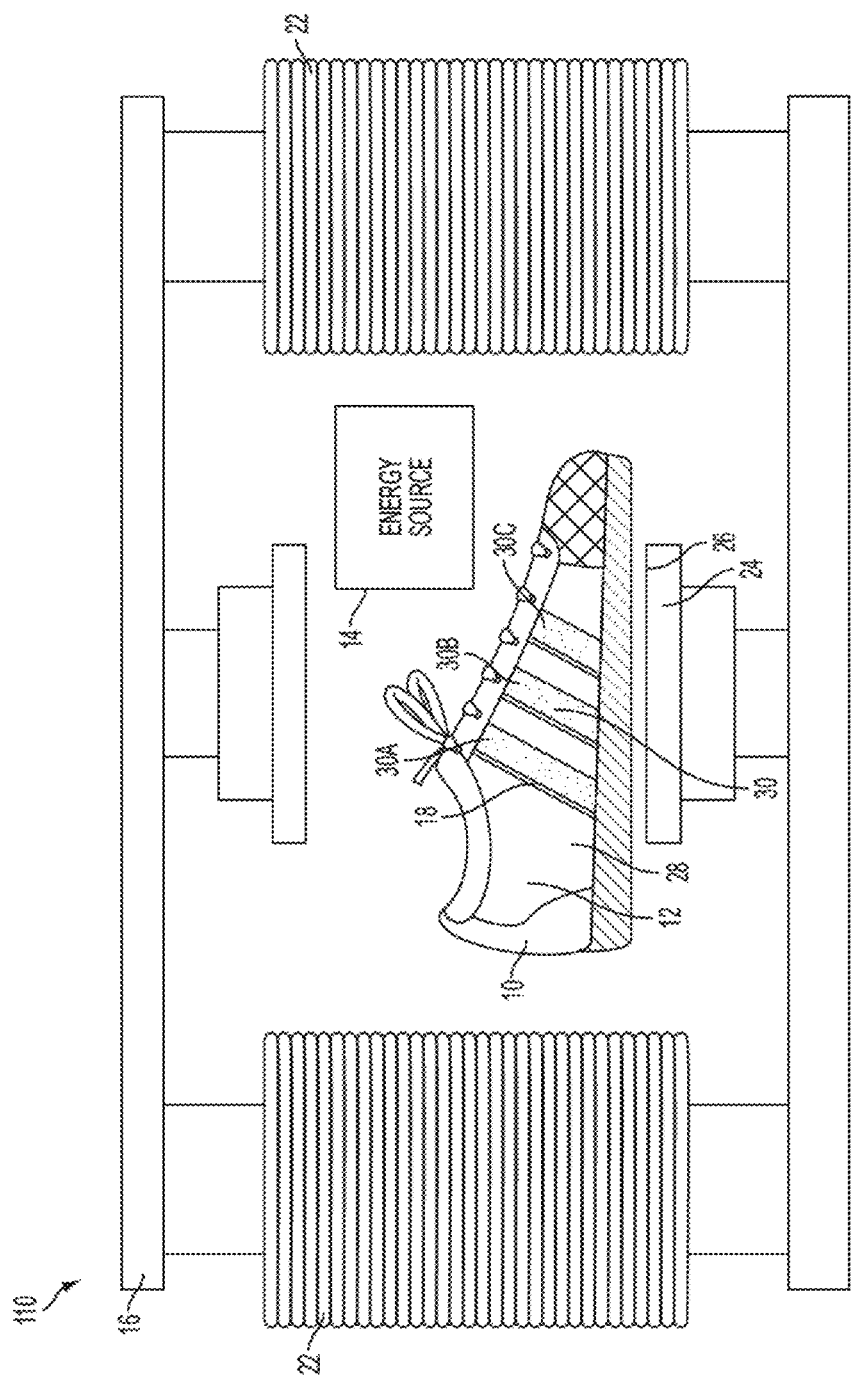
FIG. 3 is a front view of a tuning device with a batch platform design, according to certain embodiments of the present invention.
Figure 4:
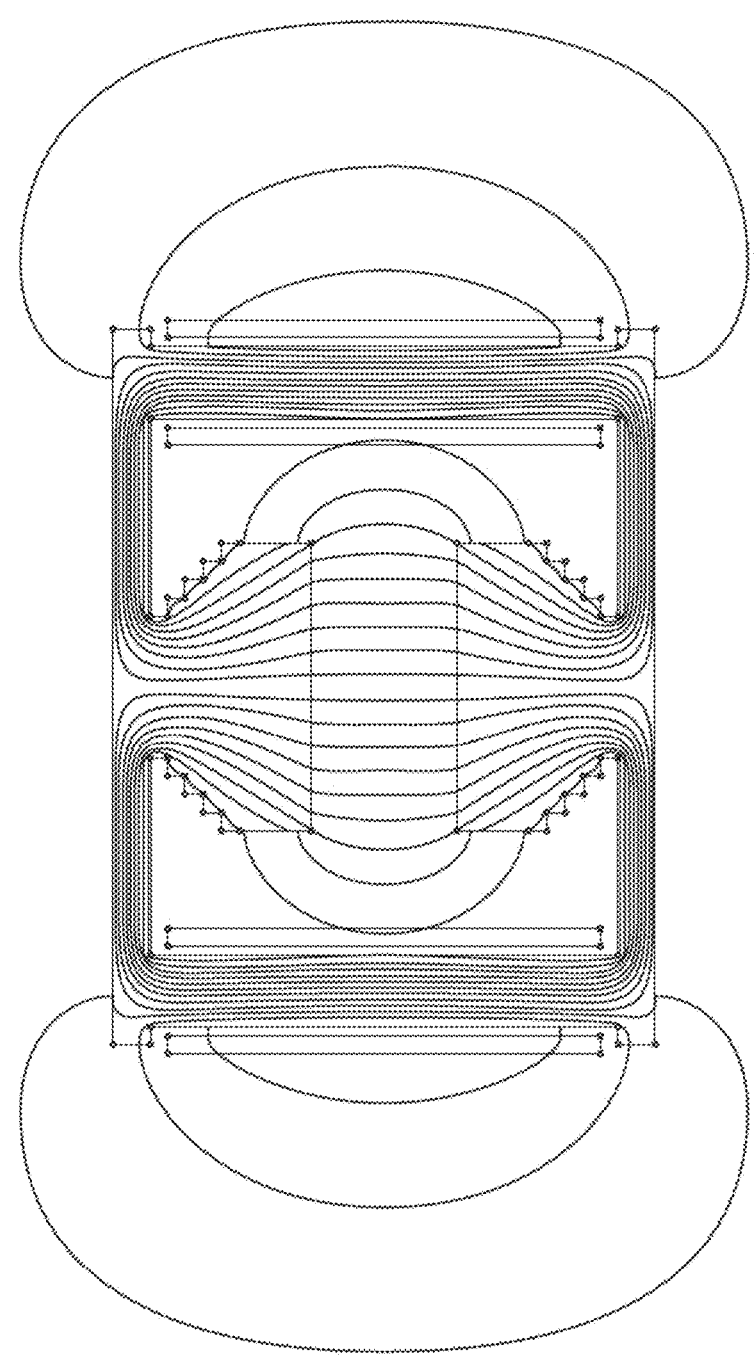
FIG. 4 is a magnetic flux diagram showing the magnetic field generated around the tuning device of FIG. 3.
Figure 6:
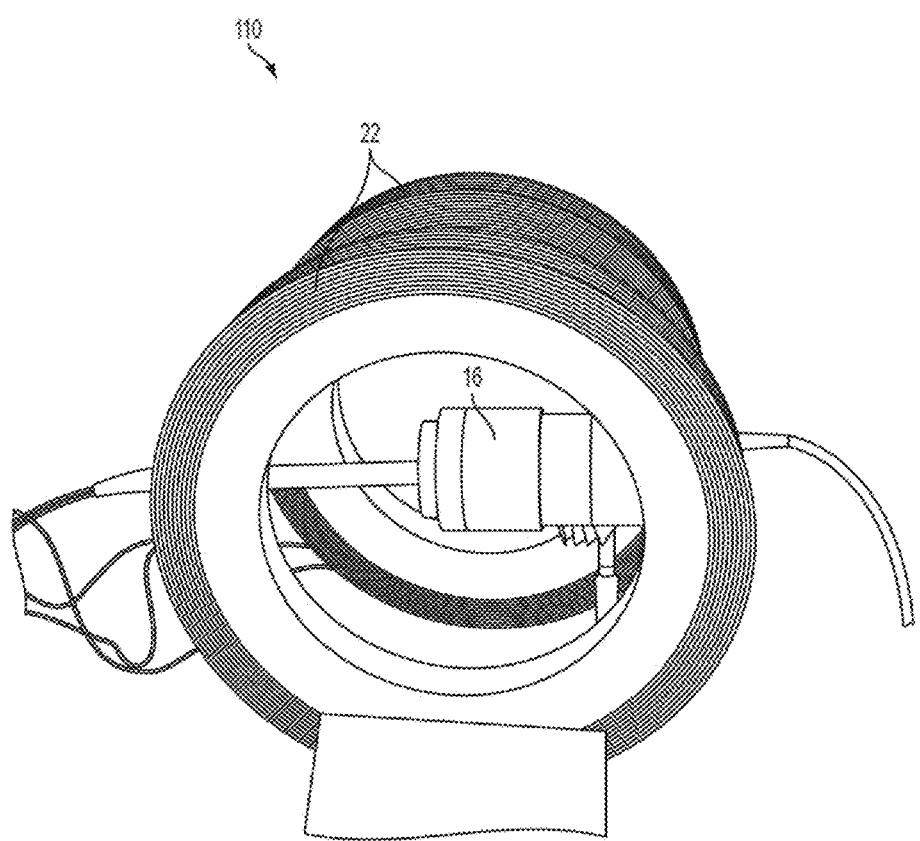
FIG. 6 is a perspective view of a tuning device with a batch platform design with a different coil design, according to certain embodiments of the present invention.

As illustrated in FIG. 3, certain embodiments of the tuning device 110 comprise a magnetic field source 16 and/or an energy source 14. In the simplest of these embodiments, the tuning device 110 comprises a set of coils 22 that produce a magnetic field. The coils 22 are arranged so that the magnetic field is concentrated and oriented perpendicular to a platform 24. FIG. 4 is a magnetic flux diagram showing the magnetic field generated around the platform 24. For example, in FIG. 3, the coils 22 are arranged so that a longitudinal axis of the coils 22 is perpendicular to a surface 26 of the platform 24. In other embodiments, as shown in FIGS. 5A-5B and 6, the coils 22 are arranged so that a longitudinal axis of the coils 22 is parallel with the surface 26 of the platform 24. A person of ordinary skill in the relevant art will understand that any suitable arrangement of coils 22 may be used in conjunction with the platform 24 that produces the desired magnetic field application.

A material 10 and/or the article of wear 12 containing nanocrystal chains may be placed on the platform 24 so that the magnetic field causes the nanocrystals to shift within the chains display a particular color related to the strength of the magnetic field. In certain embodiments, the tuning device 110 may be coupled with the energy source 14 in order to create a small uniform magnetic field to make small and intricate changes to an article. This type of device may be applicable for a treatment of an individual finished good in a retail environment, such as to provide a particular customer with a customized item.

For example, the embodiments of the tuning device 110 described above may be coupled to a convection heat source 14 to manipulate the color displayed by a shoe 28, where only stripes 30 or other small features of the shoe 28 include chains of nanocrystals. As a result, the stripe 30 color may be altered in a small tuning device 110 without affecting any properties of the remaining shoe material.

Alternatively, the embodiments of the tuning device 110 described above may be useful for embellishing details like a signature or logo on articles of wear 12 when coupled with a directionally controlled laser, such as the version described in U.S. Pat. No. 4,721,274. Such lasers are often fixed, but the light output is manipulated and aimed by a gimbal mounted mirror or other optics. With the laser output controlled by a numerical control device, the magnetic field may be sufficiently uniform to achieve a single desired color or it may be varied to achieve a variety of color effects from a rainbow to a random effect.

Figure 7:
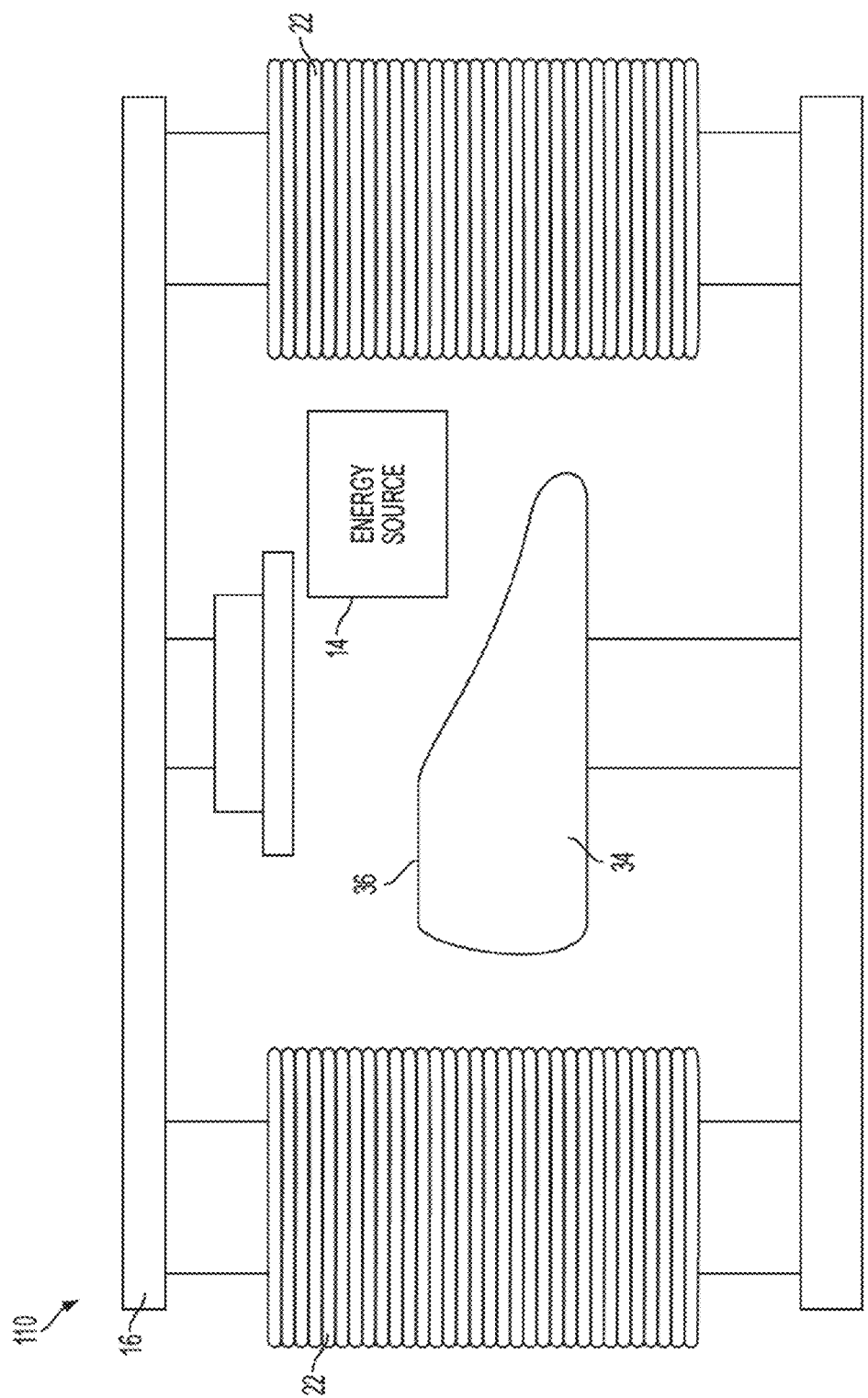
FIG. 7 is a front view of a tuning device with a metal shoe last design, according to certain embodiments of the present invention.

In certain embodiments, as shown in FIG. 7, a metal shoe last 34, which is a foot-shaped form used by shoemakers to shape shoes as they are being made, may be used as a receiving antenna in place of the platform 24. In these embodiments, the magnetic field is substantially uniform over a surface 36 of the metal shoe last 34 and, since the metal shoe last 34 is shoe-shaped, the magnetic field is therefore substantially uniform over a surface of a shoe placed thereon. The metal shoe last 34 may also be made into a magnetic coil.

In yet other embodiments, as best illustrated in FIGS. 20A-20C and 21, the tuning device 110 comprises a platform 24 that is applicable to batch treatment of substantially flat materials 10 and/or articles of wear 12 that have a larger surface area than what is typically treated with the tuning device 110 design shown in FIG. 3. In these embodiments, the platform 24 comprises the substantially flat surface 26, which may have dimensions of approximately 9 inches by 6 inches (such as the size of A5 format paper), but may also have any size suitable for batch processing of substantially flat items. In these embodiments, a gap 90 between the surface 26 of the platform 24 and an upper surface 84 may be in the range of 1 inch to 2 inches, but any suitable gap may be used.

Figure 20A:
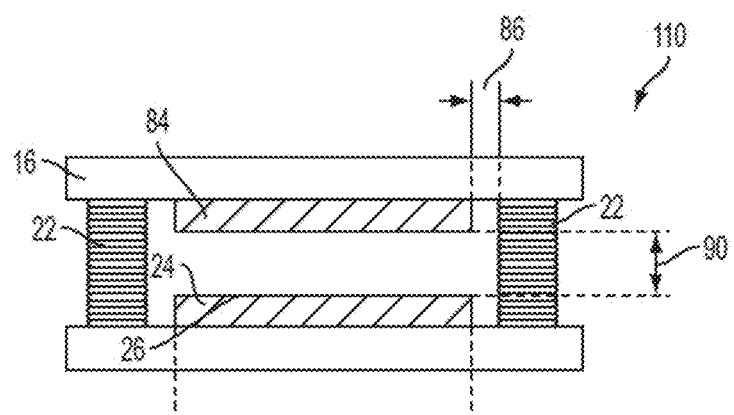
FIGS. 20A, 20B, and 20C are front view and top views of a tuning device configured to provide a uniform magnetic field over a larger surface area, according to certain embodiments of the present invention.
Figure 20B:
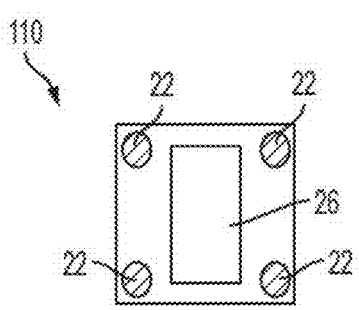
Figure 20C:
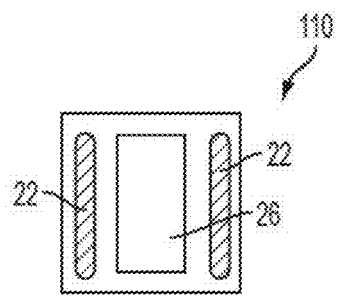
Figure 21:
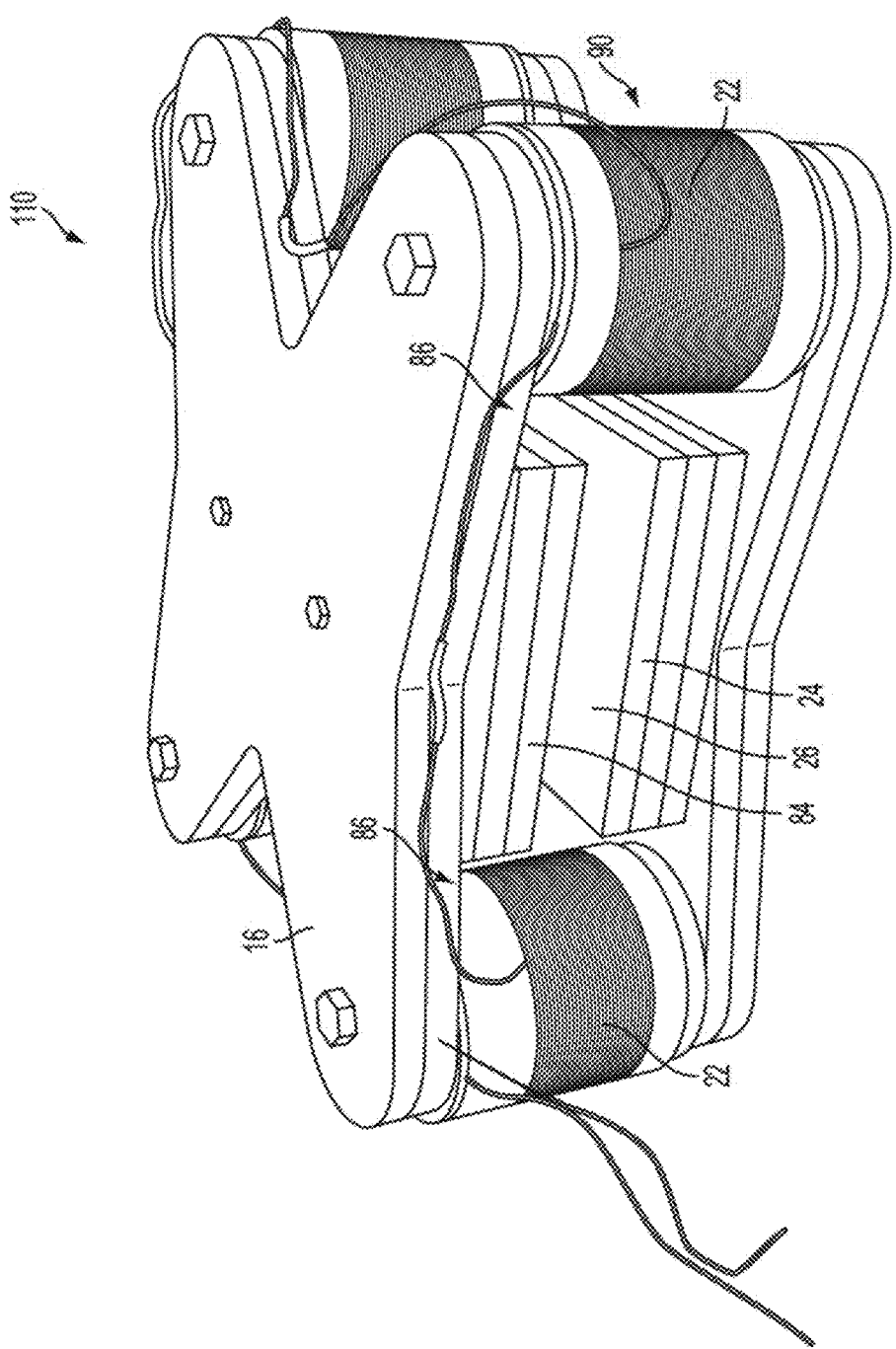
FIG. 21 is a perspective view of a tuning device configured to provide a uniform magnetic field over a larger surface area, according to certain embodiments of the present invention.

In these embodiments, as shown in FIGS. 20A-20C and 21, the tuning device 110 may comprise a four coil 22 design (as shown in FIG. 20B) or a two coil design (as shown in FIG. 20C) that provide a uniform magnetic field that is concentrated and oriented perpendicular to the surface of the platform 24. A person of ordinary skill in the relevant art will understand that any suitable arrangement of coils 22 may be used in conjunction with the platform 24 that produces the desired magnetic field application across the surface of the platform 24. Furthermore, an additional lateral spacing 86 may be included between the coils 22 and the upper surface 84/platform 24 to reduce interference created by the proximity of the platform 24 (and the upper surface 84) to the coils 22.

Continuous Platform Design

Figure 8:
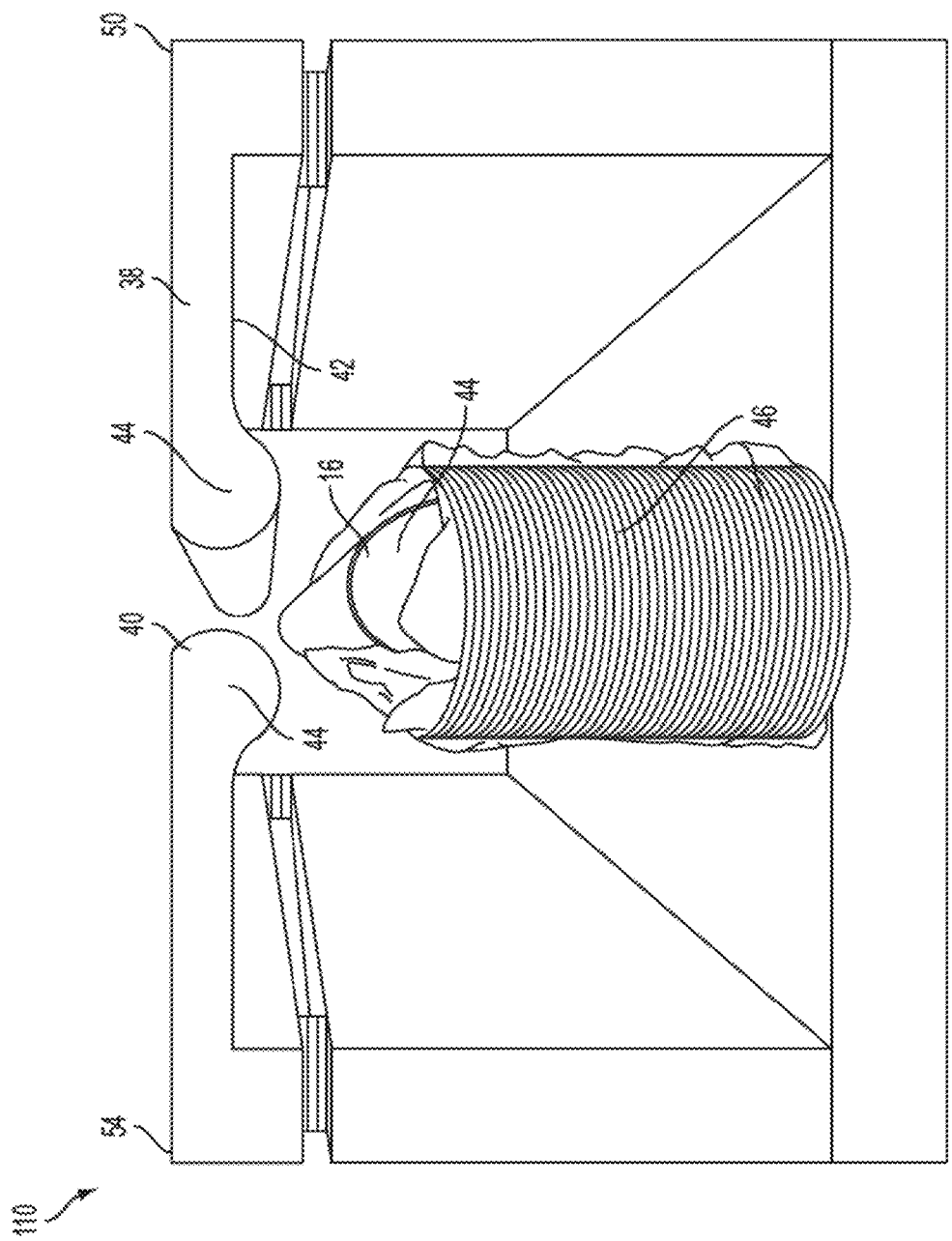
FIG. 8 is a front view of a tuning device with a continuous platform design, according to certain embodiments of the present invention.
Figure 9:
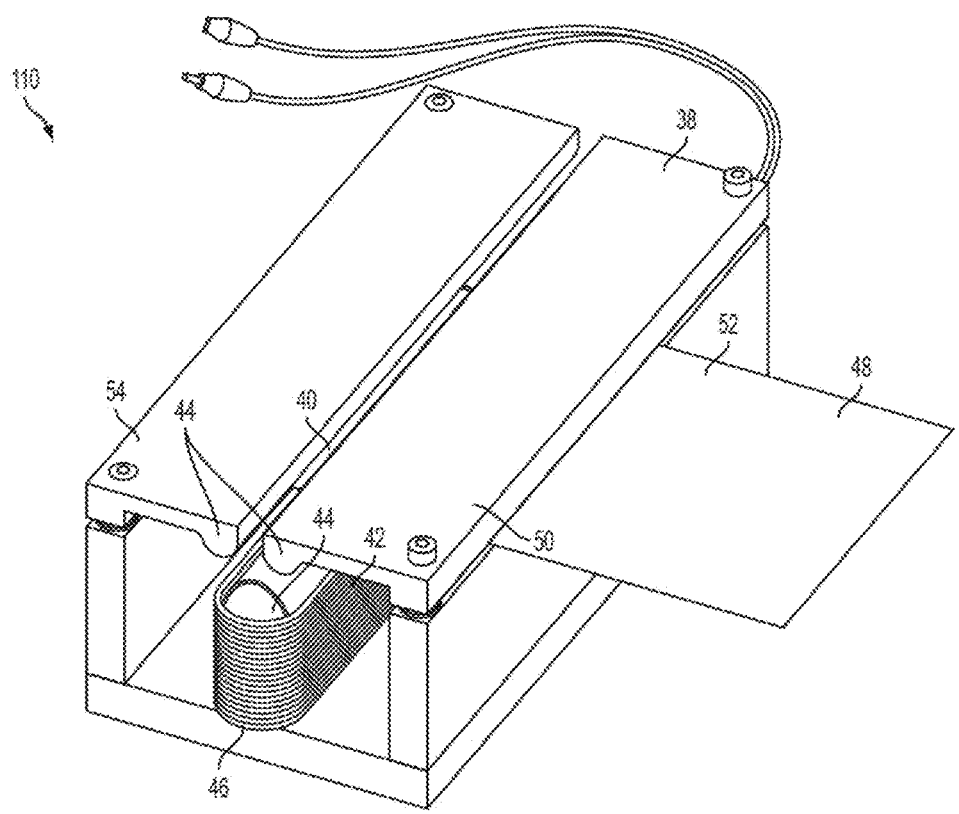
FIG. 9 is a perspective view of the tuning device of FIG. 8 with a portion of a textile positioned therein.
Figure 10:
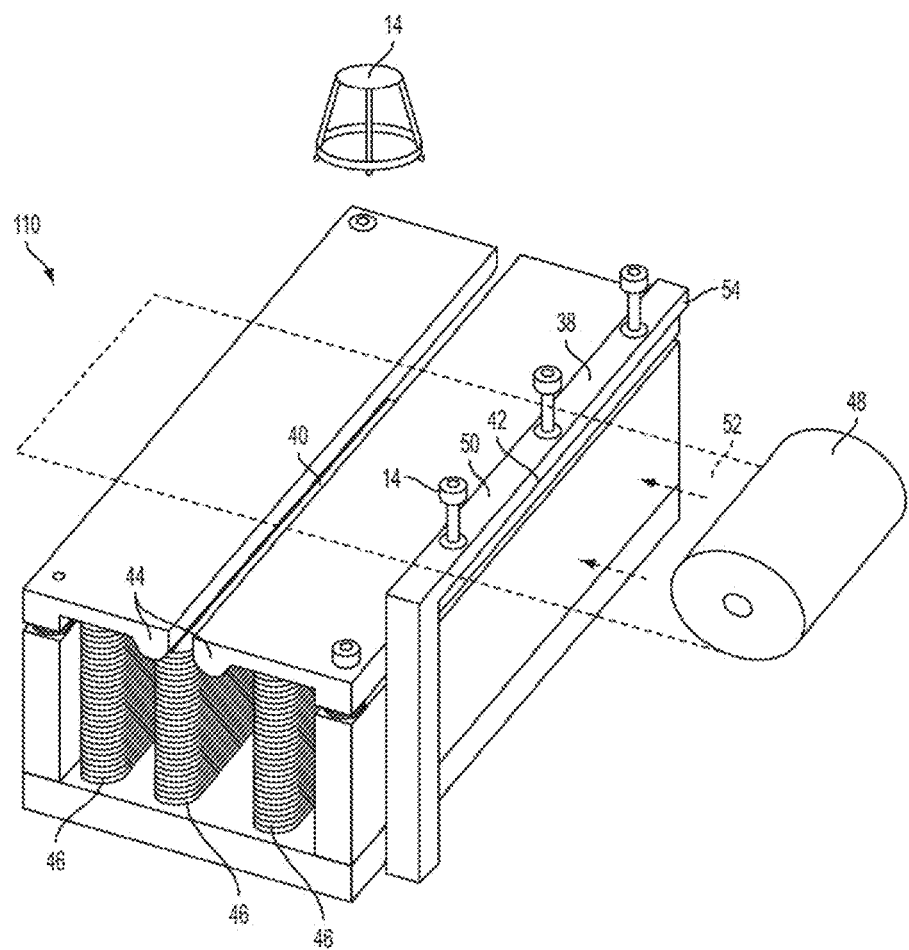
FIG. 10 is a perspective view of the tuning device of FIG. 8 in a roll-to-roll application.

Additional embodiments of the tuning device 110 are shown in FIGS. 8-10. In these embodiments, the tuning device 110 comprises a platform design that would be applicable for continuous treatment of substantially flat materials and articles, such as in a roll-to-roll treatment of a textile to set the color prior to manufacture of the article of wear 12 at a factory level. For example, as shown in FIGS. 8-10, the tuning device 110 comprises a platform 38 having a gap 40 of approximately 0.5 inches in width, and approximately 8.5 inches in length, but may be configured to have a length of up to at least 60 inches. The platform 38 comprises a substantially flat surface 42 having the gap 40 therein, wherein the platform 38 is configured so that at least a portion of the material 10 and/or the article of wear 12 is positioned adjacent the surface 42 of the platform 38 and the gap 40 therein.

Figure 11:
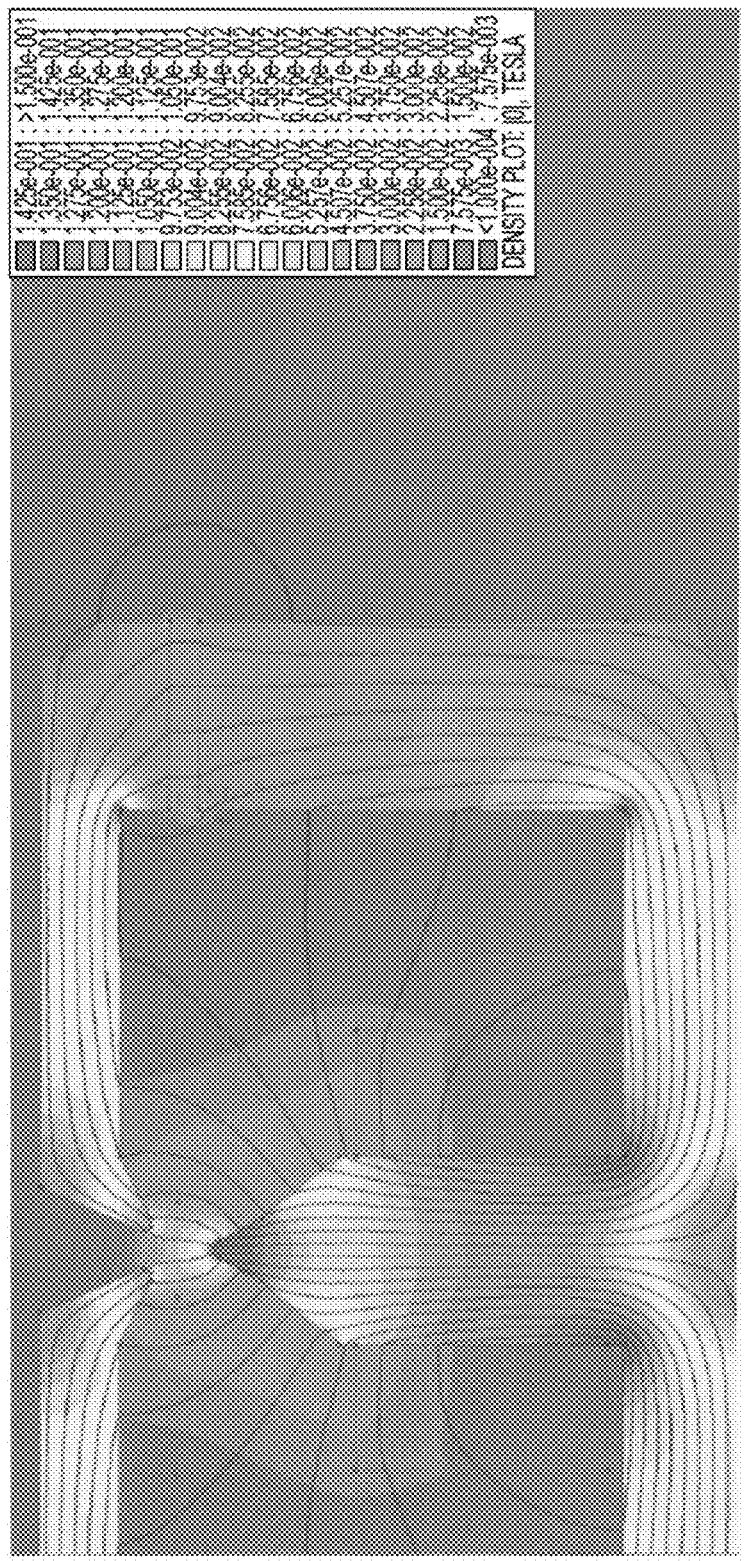
FIG. 11 is a magnetic flux diagram showing the magnetic field generated around the tuning device of FIG. 8.
Figure 12:
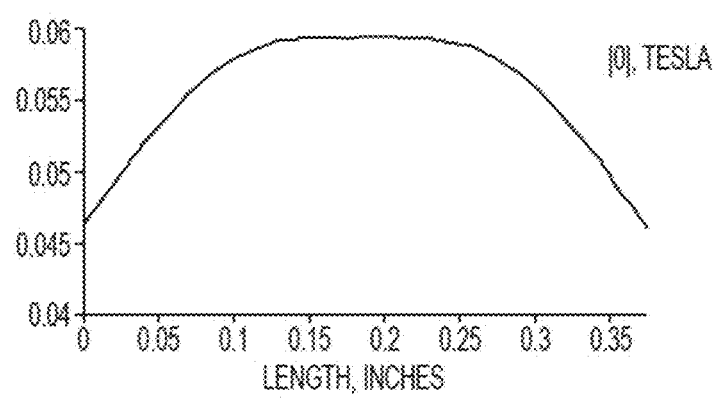
FIG. 12 is a graph showing the uniformity of the magnetic field across the gap of the tuning device of FIG. 8.
Figure 13:
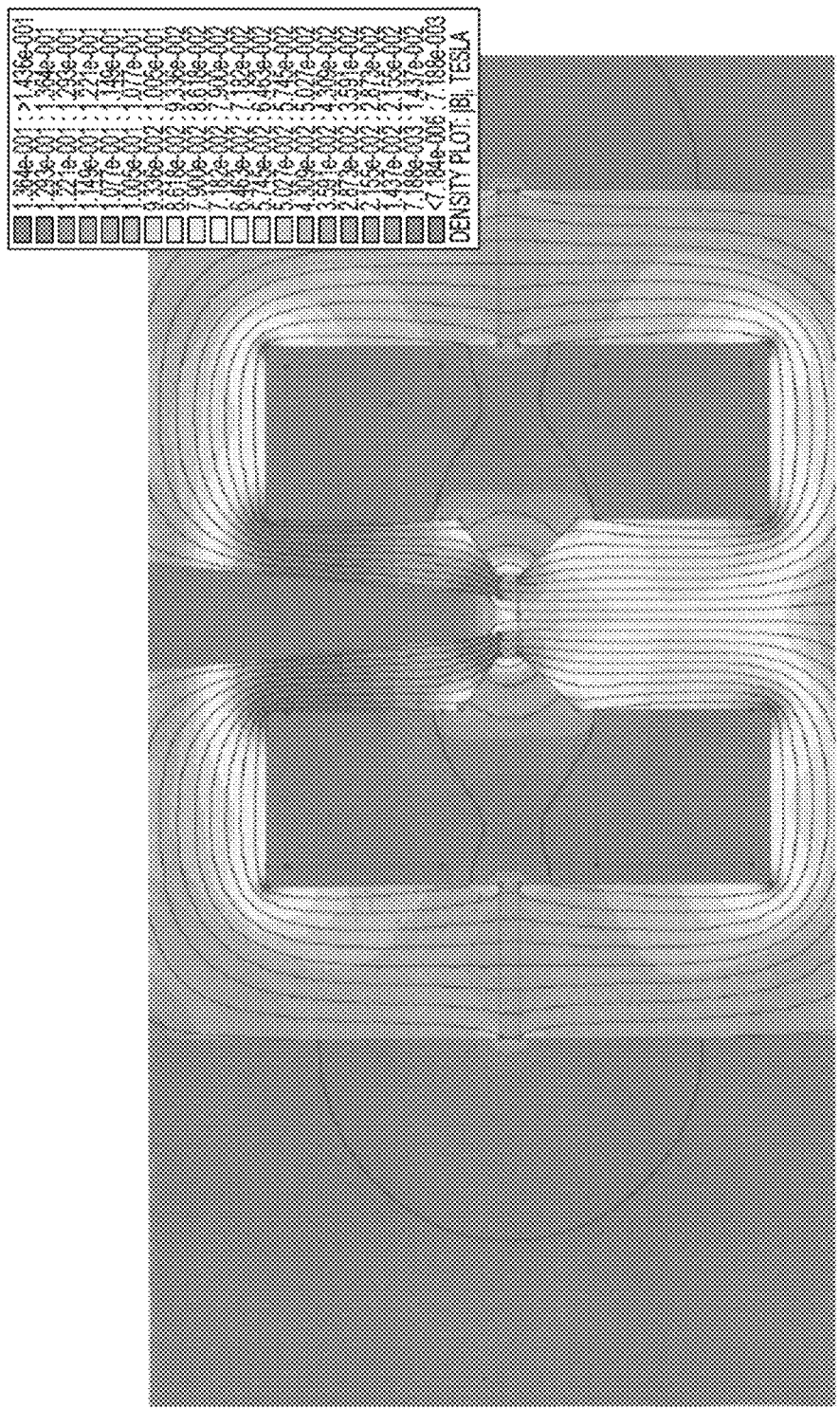
FIG. 13 is a magnetic flux diagram showing the magnetic field generated around the tuning device of FIG. 8 with a greater distance between the platform and the prong.
Figure 14:
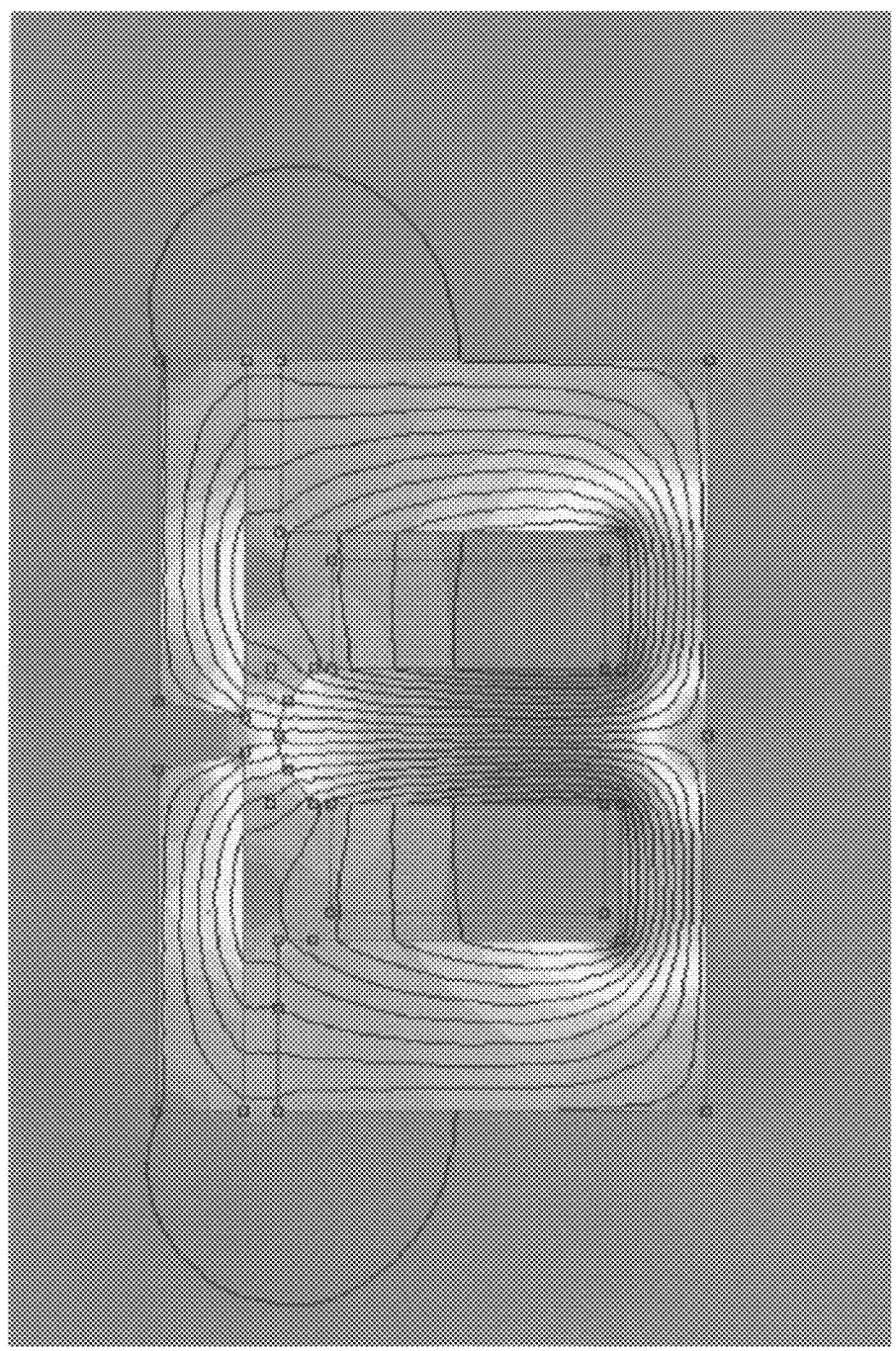
FIG. 14 is a magnetic flux diagram showing the magnetic field generated around the tuning device of FIG. 8 with a smaller distance between the platform and the prong.

An arrangement of prongs 44 and coils 46 are positioned below the gap 40 so as to induce a magnetic field, wherein at least a portion of the magnetic field passes through the gap 40 and is oriented substantially perpendicular to the surface of the platform 38 in the region of the gap 40 (as shown in the magnetic flux images shown in FIGS. 11 and 13-14) and therefore is also substantially perpendicular to the portion of the article of wear 12 positioned proximate the gap 40. In certain embodiments, the design may generate almost 2,000 gauss, wherein the amount of current is directly proportional to the gap and the dimension between the plates (antennas). For example, 1 inch gap will require 1/10 of the current of a 10 inch gap. An energy source, such as a UV laser may be positioned above the gap and directed to apply UV radiation to material that is positioned proximate the gap. In other embodiments, a focused UV lamp that shoots through the gap may be used.

Thus, in these embodiments and as illustrated in FIG. 10, a roll of textile 48 containing dynamic nanocrystal chains may be unrolled proximate a first end 50 of the platform 38 so that an unrolled portion 52 is positioned adjacent the surface 42 of the platform 38 and the gap 40 therein. The magnetic field of the tuning device 110 is set to tune the color displayed by the nanocrystal chains to the desired amount, and the energy source 14 provides sufficient energy to soften portions of the textile 48 (specifically the fibers within the textile 48 or even the encapsulation inside the fibers) immediately surrounding the chains of nanocrystals to allow localized movement of the nanocrystals within the chains to the desired location set by the magnetic field (or to destroy the encapsulation of the nanocrystal chains), and the portions of the textile 48 subsequently harden or set sufficient quickly to fix the location of the nanocrystals within the chains and thereby fixing the color of the textile 48. The textile 48 is then re-rolled proximate a second end 54 of the platform 38 after passing through the tuning device 110. While this example describes the use of these embodiments with roll-to-roll applications, a person of ordinary skill in the relevant art will understand that this is but a few examples of ways in which such a design may be used to tune color in materials and articles containing nanocrystal chains in either a continuous or batch process.

Drum Design

Figure 15:
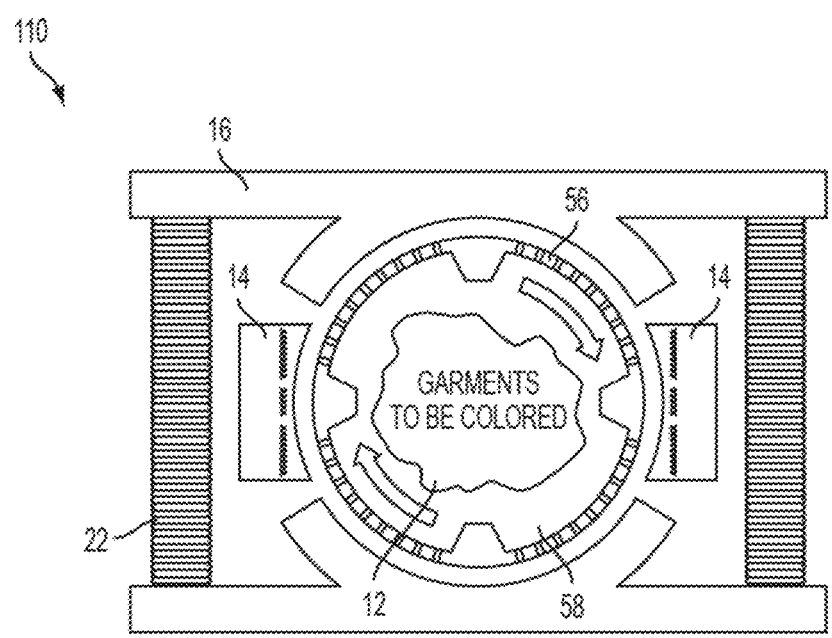
FIG. 15 is a front view of a tuning device with a drum design, according to certain embodiments of the present invention.

Additional embodiments of the tuning device 110 are shown in FIG. 15. In these embodiments, the tuning device 110 comprises a cylindrical drum design, wherein the magnetic field source 16 is incorporated into a drum 56 of a machine 58 similar to an industrial dryer. In other words, the machine 58 may be a radiation generating revolving drum machine 58. The energy from the machine 58 would provide sufficient energy to allow localized movement of the nanocrystal chains to the desired location set by the magnetic field, and the material 10 will subsequently harden or set within the machine 58 while the magnetic field is still applied to fix the location of the nanocrystals within the chains.

Thus, in these embodiments, finished goods (such as articles of wear 12) that have been manufactured with dynamic nanocrystal chains (or with reversibly fixed nanocrystal chains for which the color now requires modification) may be placed within these embodiments of the tuning device 110, the magnetic field setting adjusted to provide the desired color by the nanocrystal chains, and the energy provided by the machine 58 set to allow for manipulation of the nanocrystal locations within chains. These embodiments may be particularly useful at distribution centers, wherein the techniques may also involve application of energy sources from heat, UV, and/or microwave radiation.

The advantage of these embodiments is that it is capable of color shifting a batch of articles at once and with great uniformity. It also has the advantage of achieving uniform temperature distribution with simple and known techniques. For example, a 95 GHz radiation beam (similar to the device used in Active Denial Systems by the military) may be used to soften or melt a first layer containing the nanocrystal chains, without penetrating at least one additional layer, such as a fabric and/or PU layer. At this frequency (>90 GHz), the radiation penetration depth is less than 1/64 inch, as opposed to 0.5-3 inches for microwave and IR heaters. Alternatively, it is also possible to achieve random effects by varying the magnetic field while the articles of wear 12 are tumbled in order to achieve an effect that would be something like a tie-dye t-shirt.

Tunnel or Solenoid Design

Figure 16:
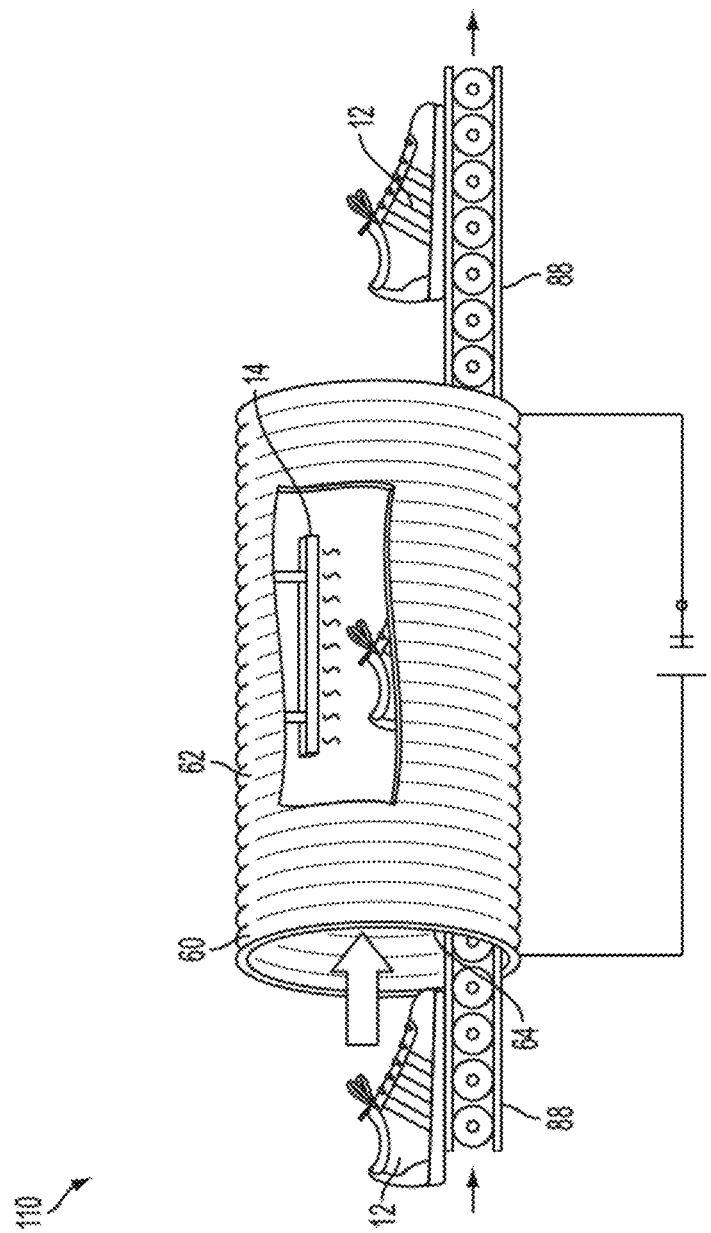
FIG. 16 is a perspective view of a tuning device with a tunnel design, according to certain embodiments of the present invention.

Additional embodiments of the tuning device 110 are shown in FIG. 16. In these embodiments, the tuning device 110 comprises a solenoid design for an activation tunnel 60, wherein solenoids 62 are long cylindrically-shaped coils, such that a plurality of solenoids 62 are positioned substantially surrounding the activation tunnel 60. The activation tunnel 60 comprises a central opening 64 that is configured so that the material 10 and/or the article of wear 12 is located within the activation tunnel 60. With a sufficiently large solenoid 62, a constant EM field may be generated inside the activation tunnel 60, and may influence larger objects of batches of articles of wear 12 put inside the activation tunnel 60 and may be conveyed through the activation tunnel 60 with a conveyor 88. These embodiments are also provided with the energy source 14, which would provide sufficient energy to allow localized movement of the nanocrystals within the chains to the desired location set by the magnetic field, after which the material 10 and/or the article of wear 12 will subsequently harden or set while the magnetic field is still applied to fix the location of the nanocrystals within the chains. These embodiments may have an overall size of a standard cloth dryer, but may be larger or smaller as needed depending upon the exact application and use.

Thus, in these embodiments, finished articles of wear 12 that have been manufactured with dynamic nanocrystal chains (or with reversibly fixed nanocrystal chains for which the color now requires modification) may be placed within these embodiments of the tuning device 110, the magnetic field setting is adjusted to provide the desired color by the nanocrystal chains, and the energy provided by the energy source is set to allow for manipulation of the nanocrystal locations. These embodiments may be particularly useful at distribution centers, wherein the techniques may involve application of energy sources from heat, UV, and/or radar.

Extruder Coils

Figure 17:
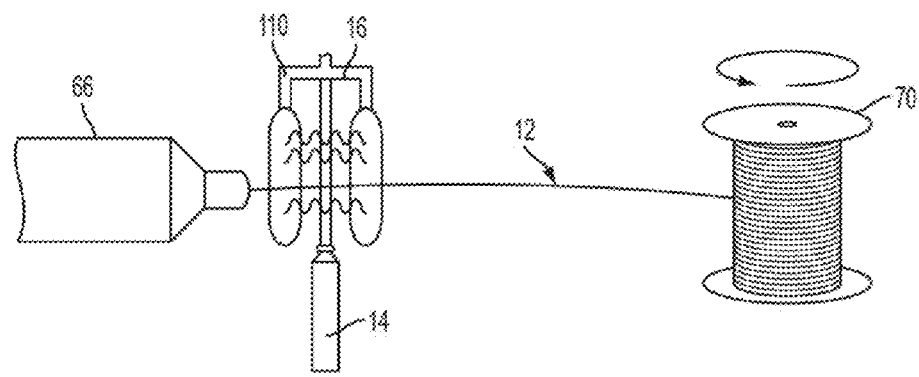
FIG. 17 is a perspective view of a tuning device with an extruder coil design, according to certain embodiments of the present invention.

Additional embodiments of the tuning device 110 are shown in FIG. 17. In these embodiments, the tuning device 110 comprises one or more small energy sources 14 (such as a small heater or UV lamp or laser) and one or more magnetic field sources 16 (such as one or more small magnets) positioned between an extruder 66 and a textile producing machine 70 (such as a weaving loom and/or a knitting machine and/or a roll of finished materials 10) to manipulate the color displayed by nanocrystal chains embedded within the yarn or threads as the threads or yarns are fed into the machines 70, and may be particularly applicable at the factory level.

These embodiments have the additional advantage that knitting and weaving processes would require fewer layers or changes in thread to achieve a pattern or effect in the output fabric. For example, if the fabric had a striped pattern, the machine 70 could simply pull a single yarn or thread and manipulate the color as the fabric is woven. This reduces the need to pull several different color yarns and also reduces the need to join yarn where the color changes.

Focused Microwave Activation

Additional embodiments of the tuning device 110 are shown in FIG. 18. In these embodiments, the tuning device 110 comprises focused microwave activation, in which a different type of emitting antenna 72 would send a focalized beam of microwaves on the material area that is being treated. The concept is similar to using a spotlight instead of a floodlight (as in a conventional microwave oven design). Because directionality of the radiation (and ease of control) in the microwave domain is typically proportional to the frequency (i.e., the higher the frequency, the easier it is to manipulate the beam), a 95 GHz radiation beam (similar to the device used in Active Denial Systems by the military) may be used to provide the focalized beam of microwaves on the material area that is being treated. As described above, at this frequency (>90 GHz), the radiation penetration depth is less than 1/64 inch.

This type of device may be applicable for a treatment of an individual article of wear 12 in a retail environment, such as to provide a particular customer with a customized item. In a larger version, this type of device may also be applicable at the distribution center level.

Pulsating Electromagnets

Additional embodiments of the tuning device 110 are shown in FIG. 18. In these embodiments, the tuning device 110 comprises pulsating electromagnets 74 (high power, short burst), which create EM fields for a short time (just for the amount of time needed for the CNC activation) so that lighter duty equipment may be a possibility. Conventionally, large EM fields created for longer durations require substantial energy and more complex machinery.

For example, as described above, a rapidly fluctuating magnetic field may be applied, which creates transient currents in the chains of nanocrystals. The transient currents may lead to the softening or melting of the surrounding substrate. Once the softening or melting has been achieved, the magnetic field may then switch to a constant (non-fluctuating) field. In this embodiment, the magnetic field could be used as both an energy source 14 (in fluctuating mode) and a magnetic field source 16 (in constant mode).

Manufacturing Advantages

Figure 1B:
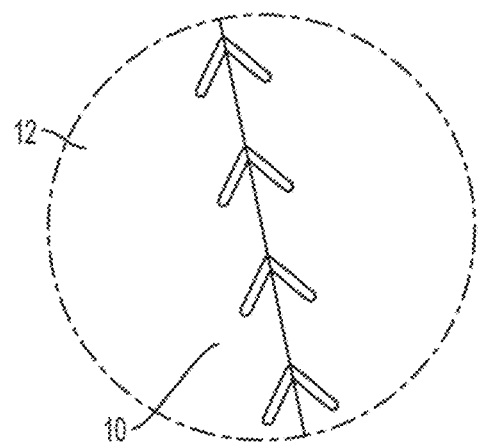

Incorporation of nanocrystal chains directly into materials used to produce apparel, footwear, sports equipment, etc. provides an ability to embellish goods with intricate patterns in post processing, while taking advantage of scale to mass produce raw templates. As shown in FIGS. 1A and 1B, certain jerseys having a two-tone coloration are conventionally manufactured through either sublimation of the color pattern onto the substrate or woven into the base fabric with two different color yarns. By incorporating a very accurate tuning device into the material itself, factories can reduce complexity by turning out goods in all one color and stock number. For instance, a certain brand of shoe may be produced in a single color and then other colors may be added to them after manufacture to suit the needs of a particular market, wholesaler, or consumer. This approach would have the added benefit of reducing the stock of multiple color materials that a factory would need to carry.

The ability to remove color from the initial production considerations, and have it as an adjustable feature downstream of the initial manufacturing process opens the possibility of moving the labor-intensive production from the factories to the distribution centers or even at retail. Currently, consumers pay a premium to customize an article of wear 12 by completing an order online after viewing a virtual model and then waiting many weeks for the product to be produced and then shipped. This approach can save labor from custom stitching and custom processing and instead take a mass produced blank and customize it in real-time.

There are also limitations in current technology that are overcome with this invention. For example, sublimation can produce vivid colors but suffers from problems reproducing sharp lines when those details are less than 3 mm in thickness, such as the chevrons shown in the jersey 12 of FIGS. 1A and 1B. As this technology can be manipulated in very fine increments, the ability to produce sharp lines in minute detail will be less of an issue.

One of the other inherent benefits of this technology is the nanocrystal chains give off a very luminescent and bright color. This has the potential to increase visibility of players or other wearers in low light situations. It also might be used to help draw attention to moving objects such as a ball or puck in flight or also a receiver's hands for a quarterback looking downfield.

Footwear Applications

For footwear, there are numerous potential applications and combinations of applications of the nanocrystal technology. For example, the nanocrystal technology may be employed to temporarily or permanently embellish graphics onto a shoe 28 or color specific regions or "color zones" 78 of a shoe. In some embodiments, only the color zones 78 of the shoe 28 may be embedded with the nanocrystal chains. In other embodiments, the entire shoe 28 may be embedded with the nanocrystal chains. For example, a high volume shoe 28 might be manufactured with black or white dyed leather, as the majority of shoes already are, but certain designs on the shoe 28 and/or other structural features such as a heel tab 80 might have the technology embedded to be later modified.

There are many different materials specifically manufactured for footwear and for which this technology may be optimized. For example, the nanocrystal technology may be incorporated into PU synthetic leather (wet and dry process), PU coated leather (dry process), textile fibers, films for in-mold decoration (injection), TPU compound and weldable foils, PU paints to spay components, and welded films and heat transfer type of applications. These nanocrystal applications may also be relevant to apparel, equipment, and accessories.

Figure 19A:
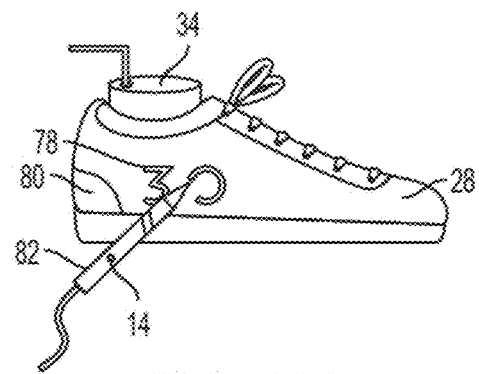
FIGS. 19A and 19B are perspective views of a stylus for customizing articles of wear, according to certain embodiments of the present invention.
Figure 19B:
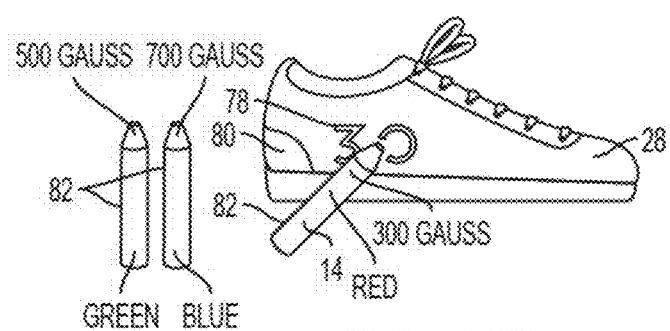

In other embodiments, as shown in FIGS. 19A and 19B, a special stylus 82 may be used, which has the ability to alter the color of the shoe 28. In this example, the stylus (or pen) 82 may be used in combination with the tuning device 110 described above or it might also have its own magnetic field source 16 (such as with a metal shoe last 34) and energy source 14 (such as a UV laser pen within the stylus 82) included in order to customize the shoe 28. In certain embodiments, different styluses 82 may have different magnetic forces that produce different colors on the shoe 28. The stylus 82 would allow the consumer to write on an article of wear 12 and later change it. For example a high-school kid could have their friends "autograph" their senior T-shirt, but then later "erase" those names if desired.

In yet other embodiments, the nanocrystal particles may be embedded in materials 10 having different melting points to simplify the modification process. For example, on the shoe 28, one stripe 30A could be created in a 60° C. medium, a second stripe 30B could be created in a 80° C. medium, and a third stripe 30C could be created in a 100° C. medium to allow for modification of specific areas at different temperatures. This design would allow the shoe 28 to be heated to 100° C. and exposed to a magnetic field tuned to the desired color for the first stripe 30A, followed by cooling down to 80° C. and exposure to a magnetic field tuned the desired color for the second stripe 30B, followed by cooling down to 60° C. and exposure to a magnetic field tuned to the desired color for the third stripe 30C. These temperatures are merely provided as an example, and any suitable materials having these or other differentiated melting points may be used that have sufficient differences to avoid disturbing the previously set colors of the other regions. However, a person of ordinary skill would understand that it would be desirable to use materials have a melting point about at least 50° C. for articles that may be placed in conditions that reach temperatures approaching 50° C., such as an enclosed car that is left in the sun for an extended period of time, so as to avoid an unintentional loss of the set coloration by allowing the nanocrystals within the chains to shift within the softened substrate in the absence of the magnetic field that organized their arrangement into photonic crystals.

Apparel Applications

As described above for footwear applications, apparel may also include coloring stripes, ribbons, jacquard, logos, accents added to the article. Thus, in certain embodiments, the various methods of applying nanocrystal chains to the materials 10 and/or the articles of wear 12, as well as the methods of tuning and fixing the color of these nanocrystal chains described above, are also applicable to apparel, including items such as base materials, stitches, buttons, zippers, closures, etc., but may have an even larger focus on the application to textiles, weaves, knits, etc.

Equipment Applications

As described above for footwear applications, certain equipment may also include grips, logos, accents, markings, stripes, etc. added to the article. Thus, in certain embodiments, the various methods of applying nanocrystal chains to the materials 10 and/or the articles of wear 12, as well as the methods of tuning and fixing the color of these nanocrystal chains described above, are also applicable to equipment. For example, matching equipment with seasonal color trends can provide consumers with opportunities to match items such as socks, gloves, and hats with other items, such as shoes and apparel. However, providing equipment in seasonal colors otherwise carries an inventory risk that may be mitigated with the ability to change colors periodically through tuning of the nanocrystal chains. The incorporation of nanocrystal chains into equipment also provides an additional opportunity for customization to the individual consumer's preference. Additionally, sports such as golf may enjoy the benefit of customization with color-specific golf balls for each player set at the beginning of each game.

Business Concepts

Factory Level

At a factory level, at least one raw material 10 incorporating nanocrystal chains may be treated with tuning devices 110 (including but not limited to the Continuous Platform Design or the Extruder Coil Design) to adjust the color of the raw materials prior to or simultaneously with the formation of the article. Incorporating the use of nanocrystal chains in raw materials and tuning devices at the factory level allows for a significant reduction in inventory of various dyes, paints, yarns, fabrics, colored plastics, finished goods etc. This process will also reduce the timeline to market by eliminating the need to match all materials before they get delivered to the factories, thus allowing quicker response time to orders. Furthermore, fewer article numbers are required to track various color versions of essentially the same article. There is also an advantage in eliminating downtime during change-over from one color to another.

Distribution Level

At a distribution center level, the finished articles of wear 12 (or intermediate goods) incorporating tunable nanocrystal chains may be treated with tuning devices 110 (including but not limited to the Drum Design and the Tunnel or Solenoid Design) to adjust the color of the finished or intermediate articles of wear 12 after manufacture, but at a larger bulk level than an individual item. Currently, large distributions centers serve as the supply and return hub for inventory coming from manufacturers and returns coming from distributors and consumers. If re-coloring is achieved at the distribution centers, inventory balancing may become instantly more dynamic.

Furthermore, if color changes are performed later in the supply chain, the distribution centers may be stocked in only a single base color and reap similar inventory reduction advantages. Distribution centers could also accept returns of poorly selling color-ways and re-color them before redistributing. From season to season, some articles will only see changes in color and no other design changes. At the end of a season, larger retailers may return unsold stock to be sold at liquidation prices. In this situation, the distribution center might simply update the returns with the new season's color and continue to sell it at the premium price that new products enjoy. This process will also help speed inventory replenishment if a neutral article can be kept in inventory and only shipped when an account requests a specific color that is selling well in a particular store, channel, or region.

Alternatively, the distribution center might continue to carry stock in each team but the jerseys might have customizable areas to later print the name and player number or these jerseys might skip the distribution center altogether and be customized at retail with a customer's name or requested player name.

Retail Level

At a retail level, the finished articles of wear 12 incorporating tunable nanocrystal chains may be treated with tuning devices 110 (including but not limited to the Batch Platform Design and Focused Microwave Activation) to adjust the color of the finished articles of wear 12 in a retail environment for a particular customer. For example, the article of wear 12 may include color zones 78 containing nanocrystal chains that can be adjusted to the customer's preference in the store prior to purchase.

Specials

Another post-production customization concept is to incorporate the nanocrystal chains in a medium, wherein the medium comprises properties that allows movement of the nanocrystals within chains without the need to soften portions of the medium immediately surrounding the chains of nanocrystals. When the medium is incorporated into an article of wear 12, as a consumer passes by a magnetic field, the color displayed by the nanocrystal chains changes without warning. The color-shifting medium may be applied to change the color of the entire article of wear 12 or perhaps just a portion, such as a color changing logo. Such an item may be used at special events. For example, a consumer might take a shirt that was purchased at a retail store or at the event itself and upon visiting an event, such as the world cup or Olympics, the shirt may be embellished with a custom graphic only available at that event. It could also be used at events to temporarily indicate that the wearer is of age to drink, has back-stage access, or some other special privilege.

Another interesting concept is similar to the event based concept but geared towards awards. As an example, there might be an achievement or trophy based system where an electronic training program user might get a special embellishment on their shirt after running a threshold number of miles, sustaining a certain pace, or completing a milestone race. A Boston marathon finisher might have their jacket customized after the race with the word "finisher" replacing "qualifier" or emblazoned with their finish time.

In these embodiments, a first color may be associated with achieving a first level for the performance parameter, a second color may be associated with achieving a second level for the performance parameter, and so on. Thus, the user may take the article of wear 12 to a retail location to have the coloration altered after achieving a particular level for the performance parameter. In these embodiments, the article of wear 12 may comprise one or more color zones 78 that may be altered or the color of the entire article of wear 12 may be altered.

Figure 22:
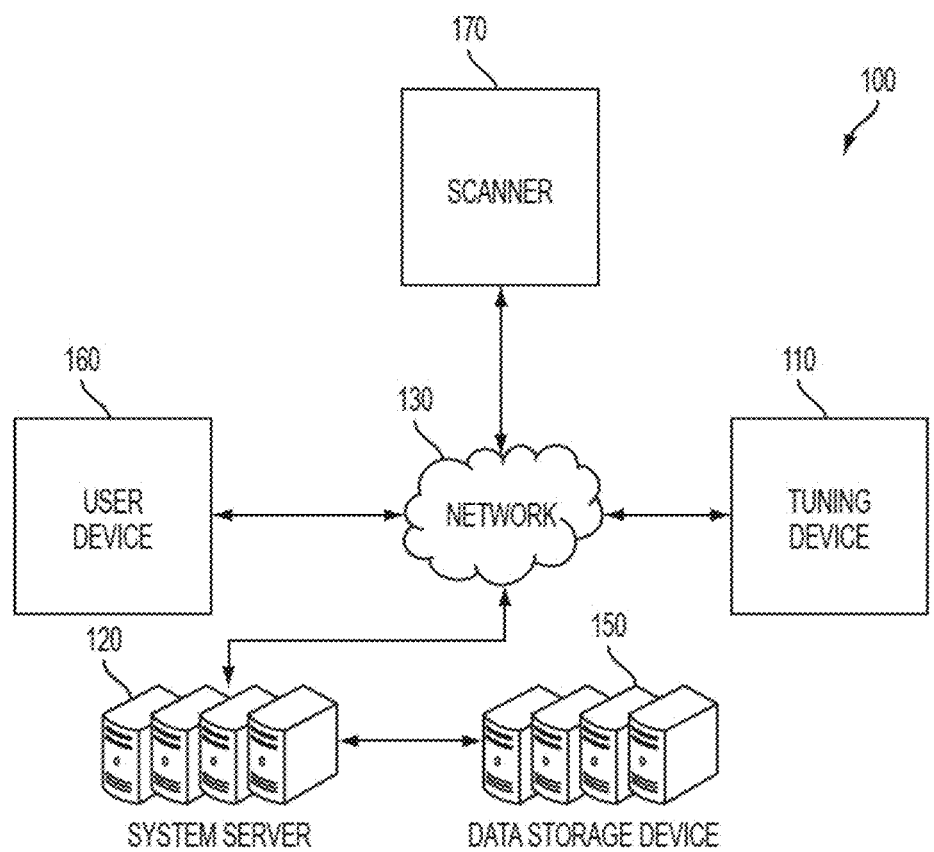
FIG. 22 is a simplified block diagram of aspects of a retail system network, according to certain embodiments of the present invention.

FIG. 22 is a simplified block diagram of a retail system 100 for manipulating the color displayed by the article of wear 12 based on achieving a particular level for the performance parameter, according to certain embodiments of the invention. The retail system 100 comprises the tuning device 110, a system server 120, a network 130, and a data storage device 150.

The system server 120 can control the hardware and software operations of the retail system 100. According to certain embodiments, the system server 120 provides various data processing, networking, and management functions.

Figure 23:
FIG. 23 illustrates an example user interface, according to certain embodiments of the present invention.
Figure 24:
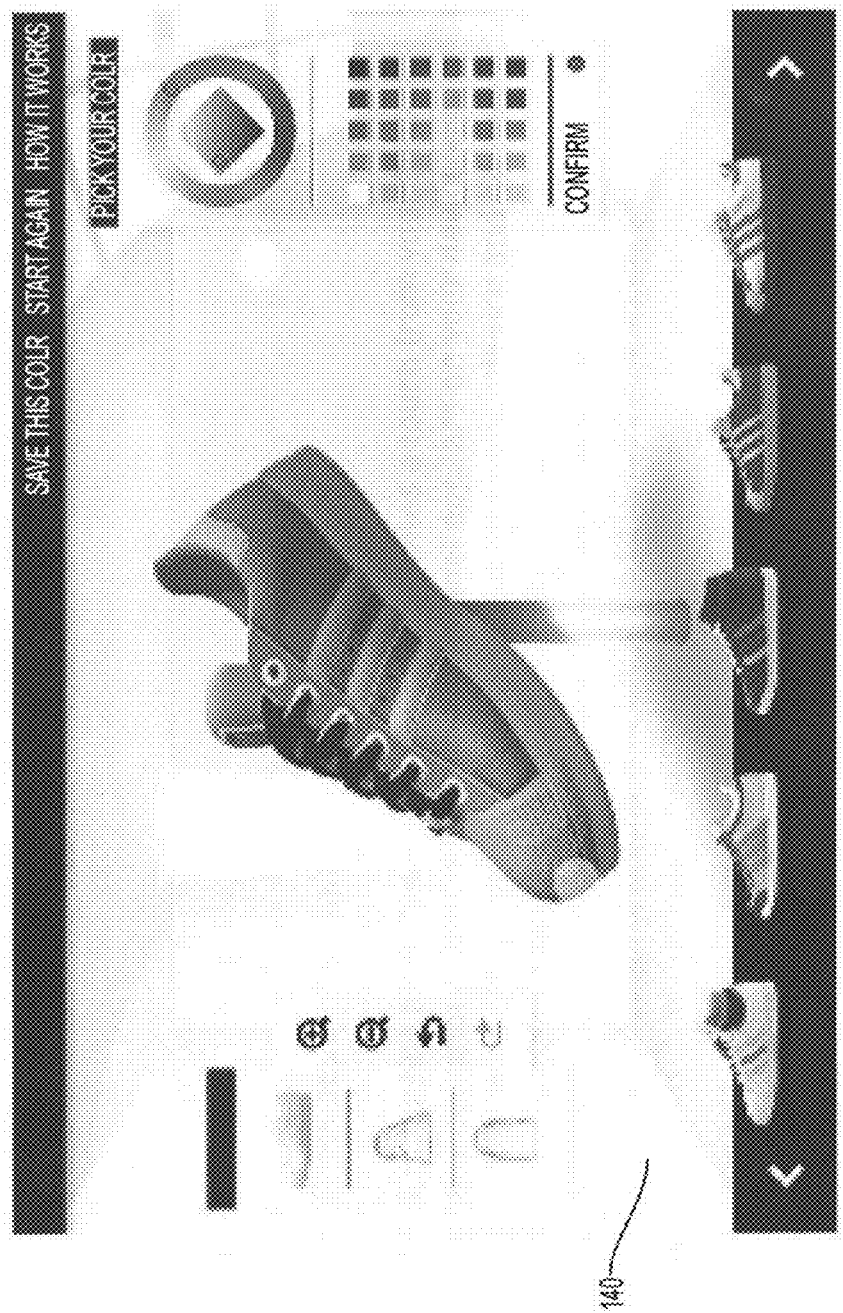
FIG. 24 illustrates another example user interface, according to certain embodiments of the present invention.

In operation, the system server 120 provides a user interface 140 that allows the user or retail store employee to input information. FIGS. 23-24 illustrate exemplary embodiments of such user interfaces 140. The system server 120 may also connect directly to a user's device 160. In certain embodiments, a data storage device 150 includes a table of colors associated with each level for various performance parameters, as well as information regarding the strength of the magnetic field required to achieve a particular color for the material 10 or transfer medium 20 in which the nanocrystal chains are embedded. The data storage device 150 may further include a table of materials that are used in the article of wear 12 based on a product serial number, barcode, tag, or other identifier, as well as a table of materials that may be used to form any color zones 78 within the article of wear 12. The data storage device 150 may also include a list of colors available for various articles of wear, along with locations of color zones 78 available for various articles of wear 12. In some embodiments, the data storage device 150 is located within the system server 120. The details of the retail system 100 and the user interface 140 are further discussed below and depicted in FIGS. 22-26.

According to certain embodiments, the system server 120 may transmit the user interface 140 to perform a variety of retail functions. For example, the system server 120 can retrieve user information (including location, date, time, performance information, etc.) from the user through the user interface 140 by connecting to the user's electronic training program (either through the network or through the user's device 160). The system server 120 can also retrieve information about the type of material 10 or transfer medium 20 in which the nanocrystal chains are embedded through the user interface 140 (by having the user input the type of material 10 or transfer medium 20 directly into the user interface 140 or by having the user input a serial number or other identifier for the article of wear 12) and/or via a scanner 170 in which the user scans a barcode, tag, or other identifier associated with the article of wear. In addition, in embodiments where the customer has the option of altering the color of certain color zones within the article of wear, the system server 120 can also retrieve information from the user regarding the color zone(s) of the article of wear 12 to be manipulated.

The customer's device 160 may be any device having the ability to communicate information. Examples of such devices 160 include but are not limited to cell phones, smart phones, personal communication service ("PCS") telephones, personal digital assistants ("PDAs"), palmtop computers, laptops/notebooks, tablet computers, handheld video games, multi-media enabled devices, mobile desktop/workstation computing device, wireless modems, digital still/video cameras, handheld devices that include short range radios (such as IEEE 802.11 or Bluetooth® but do not have cellular phones), or other similar electronic devices that are network capable.

The system server 120 typically includes an operating system that provides executable program instructions for the general administration and operation of that server, and typically includes a computer-readable medium tangibly storing instructions that, when executed by a processor of the server, allow the server to perform its intended functions. Suitable implementations for the operating system and general functionality of the servers are known or commercially available, and are readily implemented by persons having ordinary skill in the relevant art, particularly in light of the disclosure herein.

The retail system 100 in certain embodiments is a distributed computing environment utilizing several computer systems and components that are interconnected via communication links, using one or more computer networks or direct connections. However, it will be appreciated by those of ordinary skill in the art that such a system could operate equally well in a system having fewer or greater number of components than are illustrated in FIG. 22. Thus, the depiction of the retail system 100 in FIG. 22 should be taken as being illustrative in nature, and not limiting to the scope of the disclosure.

Examples of networks 130 include but are not limited to global positioning systems (e.g., "GPS"), cellular (e.g., 2G, 3G, 4G), WLAN 802.11, Bluetooth®, Radio-Frequency Identification (RFID), Worldwide Interoperability for Microwave Access (WiMax), HD Radio™, Ultra-wideband (UWB), ZigBee, and 60 GHz, and other similar networks capable of providing the necessary display, user interface, and input capabilities, as will be described in more detail below. The device 160 can communicate with one or more of these networks. For example, the communication can be downlink from the network base-station (such as satellites, WLAN or Bluetooth® base-stations, cellular towers, etc.) to the device 160 or vice versa.

The user interface 140 may be provided and controlled by the system server 120 or by the device 160. The data associated with generating, maintaining, and receiving input through the user interface 140 may be generated and provided via computer readable media included or associated with the device 160 and/or the system server 120. Examples of computer readable media include but are not limited to hard drives, disks, flash memory devices, or other similar devices. Software associated with the user interface 140 may be located on the device 160, the system server 120, or a combination thereof. For example, the user interface 140 may be an application that is stored on the device 160, the data storage device 150, a website server, or other suitable location that places the device 160 in communication with the system server 120.

Figure 25:
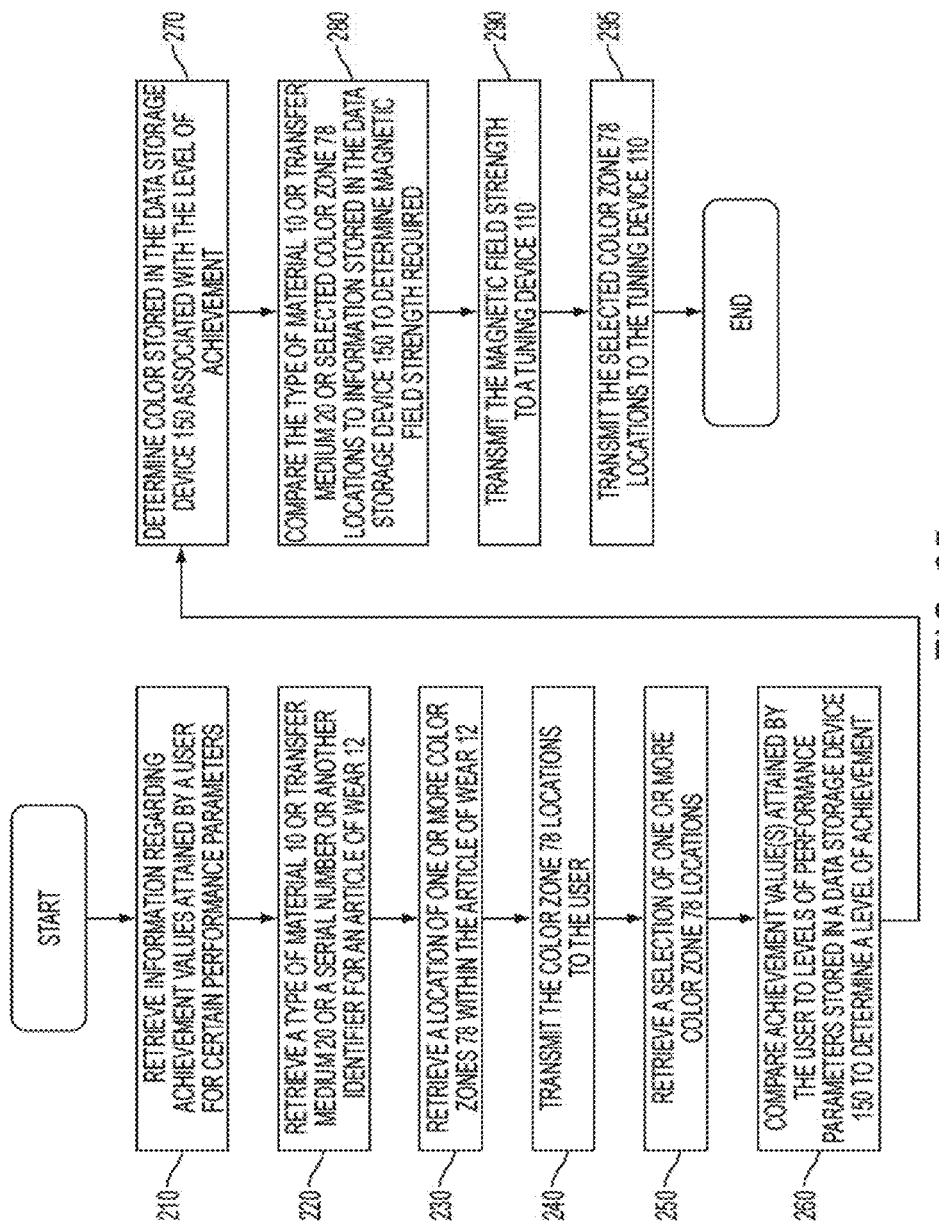
FIG. 25 is a simplified flow diagram illustrating a method for manipulating a color displayed by an article of wear on the retail system of FIG. 22 based on performance achievements, according to certain embodiments of the present invention.

FIG. 25 is a simplified flow diagram illustrating a method 200 for manipulating a color displayed by an article of wear on a retail system 100 based on performance achievements, according to certain embodiments of the invention. The method 200 is performed by processing logic that may comprise hardware (circuitry, dedicated logic, etc.), software (such as is run on a general purpose computing system or a dedicated machine), firmware (embedded software), or any combination thereof. In certain embodiments, the method 200 is performed by one or more processors in the retail system 100 of FIG. 22. In certain embodiments, the method 200 is performed by, or in conjunction with, processors located in a cloud server.

Referring to FIG. 25, the method 200 includes the step 210, in which the system server 120 may retrieve information regarding achievement values attained by the user for certain performance parameters. As described above, the system server 120 may retrieve this information by connecting to the customer's electronic training program (either through the network or through the customer's device 160).

At step 220, the system server 120 may retrieve the type of material 12 or transfer medium 20 used to form the article of wear 12 and/or may retrieve a serial number or other identifier for the article of wear 12. The system server 120 may retrieve this information directly through the user interface 140 and/or via a scanner in which the customer may scan a barcode or tag associated with the article of wear 12.

As an optional step 230, the system server 120 may retrieve the location of one or more color zones 78 within the article of wear 12 from the article of wear information stored in the data storage device 150.

As an optional step 240, the system server 120 may transmit the color zone 78 locations to the user via the user interface 140.

As an optional step 250, the system server 120 may retrieve a selection of one or more color zone 78 locations from the user where the user would like to have the color altered.

At step 260, the system server 120 compares the achievement value(s) attained by the user to the levels of various performance parameters stored in the data storage device 150 to determine the level of achievement.

At step 270, the system server 120 determines the color stored in the data storage device 150 associated with the level of achievement.

At step 280, the system server 120 compares the material 10 or transfer medium 20 used to form the article of wear 12 and/or the selected color zone 78 locations to the material and transfer medium information stored in the data storage device 150 to determine the magnetic field strength required to achieve the color associated with the level of achievement.

At step 290, the system server 120 transmits to the tuning device 110, the strength of the magnetic field that should be applied to the article of wear 12 and/or the selected color zone 78 to achieve the color associated with the level of achievement.

As an optional step 295, the system server 120 transmits to the tuning device 110, the selected color zone 78 locations for selective application of energy from the energy source.

In certain other embodiments, a user may wish to customize the article of wear with "non-earned" colors, rather than "earned" colors based on a performance achievement. The selection of non-earned colors may differ from the colors associated with achievement levels, or the selection of non-earned colors may only be available on non-performance articles of wear. In other embodiments, there may be substantial or complete overlap in the choices between non-earned and earned colors, where the non-earned colors may be available for purchase, while the earned colors are available at no additional charge.

Figure 26:
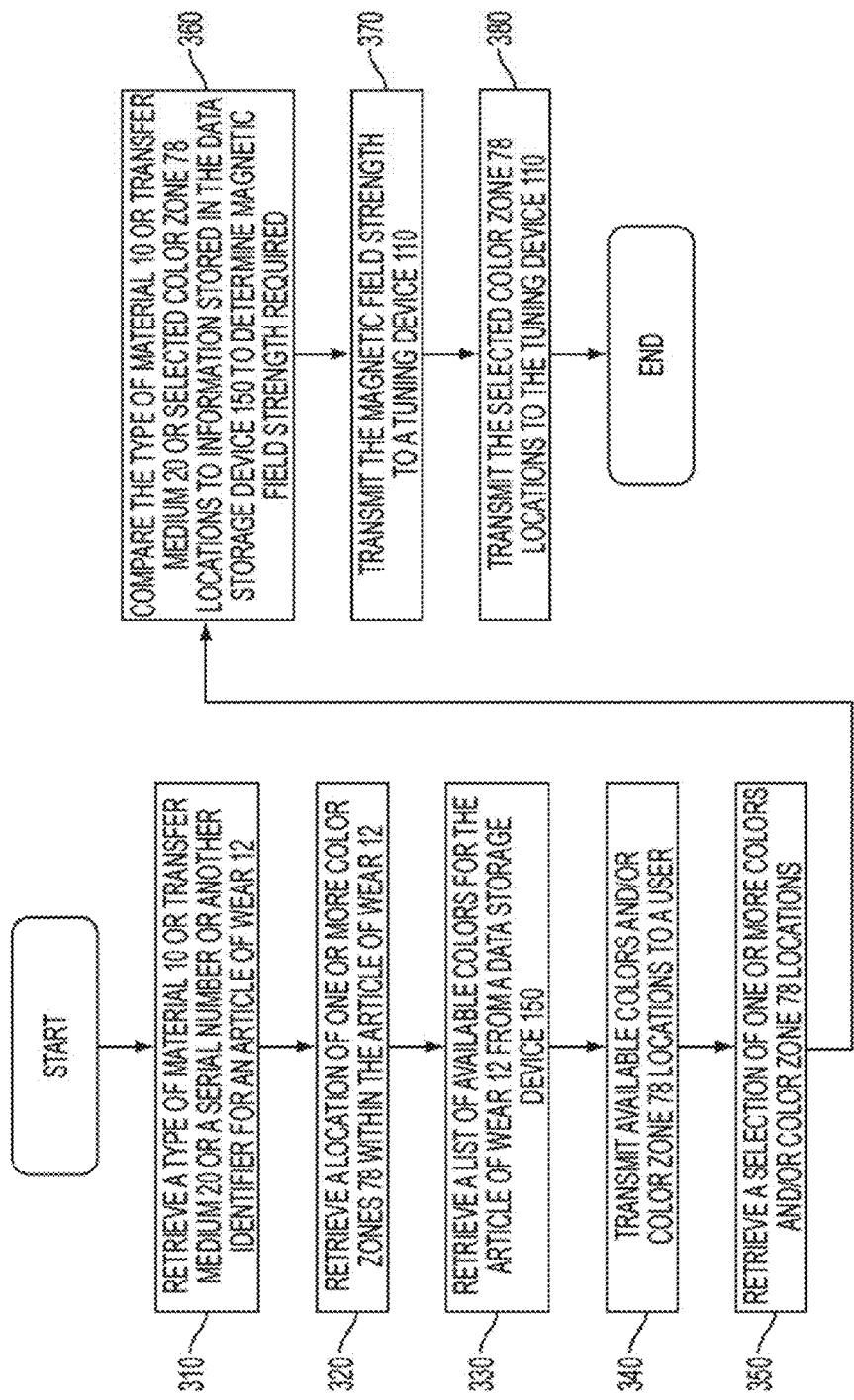
FIG. 26 is a simplified flow diagram illustrating a method for manipulating a color displayed by an article of wear on the retail system of FIG. 22 based on customization preferences, according to certain embodiments of the present invention.

FIG. 26 is a simplified flow diagram illustrating a method 300 for manipulating a color displayed by an article of wear on a retail system 100 based on customization preferences, according to certain embodiments of the invention. As described above with respect to the method 200, the method 300 is performed by processing logic that may comprise hardware (circuitry, dedicated logic, etc.), software (such as is run on a general purpose computing system or a dedicated machine), firmware (embedded software), or any combination thereof. In certain embodiments, the method 300 is performed by one or more processors in the retail system 100 of FIG. 22. In certain embodiments, the method 300 is performed by, or in conjunction with, processors located in a cloud server.

Referring to FIG. 26, the method 300 includes the step 310, in which the system server 120 may retrieve information about the type of material 10 or transfer medium 20 in which the nanocrystal chains are embedded through the user interface 140 (by having the user input the material or transfer medium type directly into the user interface 140 or by having the user input a serial number or other identifier for the article of wear) and/or via a scanner 170 in which the user scans a barcode, tag, or other identifier associated with the article of wear.

As an optional step 320, the system server 120 may retrieve the location of one or more color zones within the article of wear from the article of wear information stored in the data storage device 150.

At step 330, the system server 120 may retrieve a list of available colors for the article of wear 12 from the article of wear information stored in the data storage device 150.

At step 340, the system server 120 may transmit the list of available colors, as well as the color zone locations (if applicable), to the user via the user interface 140.

At step 350, the system server 120 retrieves a selection of one or more colors, as well as a selection of one or more color zone locations (if applicable), from the user via the user interface 140.

At step 360, the system server 120 compares material 10 or transfer medium 20 used to form the article of wear 12 and/or the selected color zone 78 locations to the material and transfer medium information stored in the data storage device 150 to determine the magnetic field strength required to achieve the color selected.

At step 370, the system server 120 transmits to the tuning device 110, the strength of the magnetic field that should be applied to the article of wear and/or the selected color zone to achieve the color selected.

As an optional step 380, the system server 120 transmits to the tuning device 110, the selected color zone locations (if applicable) for selective application of energy from the energy source.

Figure 27:
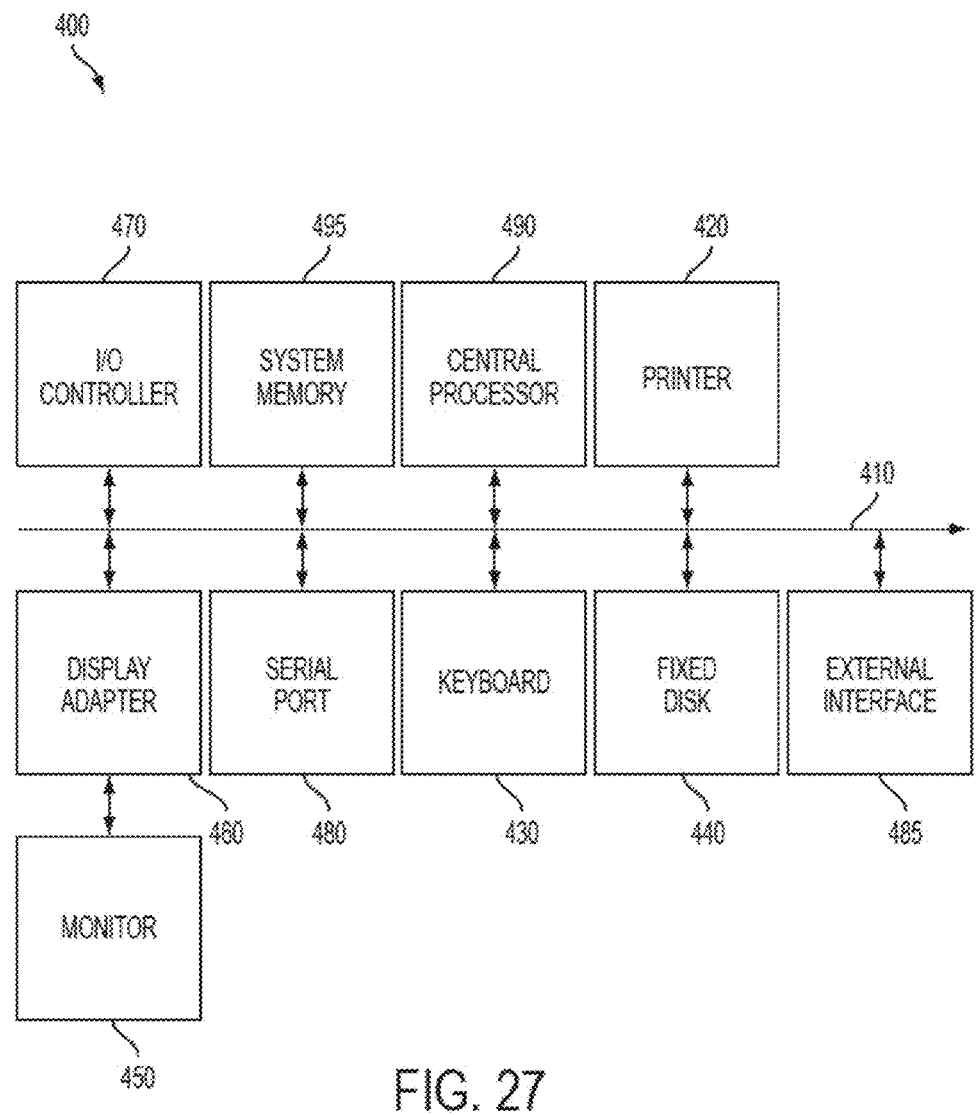
FIG. 27 is a diagram of a computer apparatus, according to certain embodiments of the present invention.

FIG. 27 is a diagram of a computer apparatus 400, according to an example embodiment. The various participants and elements in the previously described system diagrams (e.g., the retail system 100 in FIGS. 22-26) may use any suitable number of subsystems in the computer apparatus 400 to facilitate the functions described herein. Examples of such subsystems or components are shown in FIG. 26. The subsystems shown in FIG. 27 are interconnected via a system bus 410. Additional subsystems such as a printer 420, keyboard 430, fixed disk 440 (or other memory comprising computer-readable media), monitor 450, which is coupled to display adapter 460, and others are shown. Peripherals and input/output (I/O) devices (not shown), which couple to I/O controller 470, can be connected to the computer system by any number of means known in the art, such as serial port 480. For example, serial port 480 or external interface 485 can be used to connect the computer apparatus 400 to a wide area network such as the Internet, a mouse input device, or the scanner 170. The interconnection via system bus allows the central processor 490 to communicate with each subsystem and to control the execution of instructions from system memory 495 or the fixed disk 440, as well as the exchange of information between subsystems. The system memory 495 and/or the fixed disk 440 may embody a computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The invention can be implemented in the form of control logic in software or hardware or a combination of both. The control logic may be stored in an information storage medium as a plurality of instructions adapted to direct an information processing device to perform a set of steps disclosed in embodiments of the invention. Based on the disclosure and teachings provided herein, a person of ordinary skill in the art will appreciate other ways and/or methods to implement the invention.

In embodiments, any of the entities described herein may be embodied by a computer that performs any or all of the functions and steps disclosed.

Active Displays

Another concept is to showcase the technology with an active display using the products. For example, a display might be comprised of various products and color changing equipment. From time to time the display might change color or print phrases and designs on the product while potential consumers watch in astonishment.

Trending

Nanocrystal materials may be used to respond to campaigns that customize a consumer's clothing based on colors selected from celebrities, athletes, or just friends, such as through polls conducted through social media.

In other embodiments, CNC materials may be used to provide consumers with a way to color-match various items of apparel, shoes, equipment, and other accessories through take-home versions of the various tuning devices described above.

Goal/No-Goal Ball

CNC materials may be included within a ball, along with a magnetic field applied across the face of the goal, so that as the ball passes through the magnetic field, the ball changes color to indicate whether a goal was scored.

Multi-Use Field

In certain embodiments, CNC materials may be included within an artificial turf field in locations that match with various line markers. For example, a multi-use field may include markers for football, soccer, lacrosse, field hockey, rugby, and/or baseball, each of which may have a different designated color. In conventional artificial turf fields, all of the markings are permanently included for the combined sports, which can be confusing for spectators, who may not be as familiar with the color designations. In the present embodiments, the CNC materials may be included with the artificial grass fabrics in the locations for each desired marker, and a magnetic field may be incorporated into the artificial turf field in proximity to the locations for each desired marker. A controller may then be coupled to the magnetic fields, in which the controller is configured to selectively apply a magnetic field of a certain strength only to the locations with markers that are associated with a particular sport. As a result, only the markers in the locations that are associated with a particular sport will change color to the desired marker color, while the color displayed by the CNC materials in the non-desired marker locations are either not manipulated or are manipulated to display the color of the surrounding unmarked turf.

Other Applications

Slow Particles Coloration

In some embodiments, the nanocrystal chains may be incorporated into a material 10 having both memory and elastic properties, such as a slow memory foam. In these embodiments, when an external force (such as a magnetic field or a physical force) is applied to the slow memory foam (in the absence of application of an energy source), the nanocrystals may temporarily shift locations within chains based on the strength of the external force (i.e., the strength of the magnetic field and/or the amount of localized deformation to the slow memory foam caused by a physical force) and as allowed by the elasticity of the material (and thus display a temporary color), but will then shift back into their original positions due to the memory properties of the material (and thus cause the temporary color to dissipate). However, the return of the nanocrystals to their original positions may be sufficiently slow that the dissipation of the temporary color created by the application of the external force will be visually observable by an average observer's unaided eye. With the application of a magnetic field, the deformation to the slow memory foam is caused by the localized movement of the chains of nanocrystals induced by the strength of the magnetic field, whereas with the application of a physical force, the localized deformation of the slow memory foam results in the localized movement of the chains of nanocrystals.

The use of slow particles coloration as described above may be useful for training applications. For example, use of nanocrystal chains in materials with both memory and elastic properties may give a color changing effect to sports equipment, shoes, or apparel for a short duration. The result would be a surface treatment that would change color on impact and then slowly return to its natural state. This concept has the advantage that it utilizes the color shifting properties of the nanocrystal chains without the use of the tuning device 110.

As an example, a thin layer of encapsulated nanocrystal chains may be incorporated into the clubface of a golf club. Upon a player striking a ball, the impact area on the clubface would change color as the nanocrystal chains are compressed and the refractive properties changed. In these embodiments, the golf ball may include a magnet that applies the magnetic field to the club face, or the color-changing effect may rely strictly on the physical deformation of the club face. The microencapsulation polymer would be selected so that over time the nanocrystal chains would return to their original state and color but for a brief period of time would give the player an indication of the location and intensity of the strike. This same approach could be applied to the surface of the golf ball to indicate where it was struck (i.e. above or below the equator). Similar to the golf concept, this technique would be useful on other sporting equipment such as soccer (balls, shoes, and shin guards), baseball (bats, balls, bases, etc.), hockey (Sticks, pads, goals), football (balls, pads, helmets, etc.) and so on.

In additional embodiments, the color changing embodiments for a short duration may be applicable to paintball. Players wearing protective gear coated in this manner would not need to shoot paint balls but would instead shoot softer rubber bullets. This has the advantage that the bullets would be reusable and it would reduce the cost and environmental impact of the sport. In this application the encapsulating polymer is optimized for a much longer duration or even semi-permanent effect so that at the end of the match the equipment would then need to be exposed to a tuning device to restore it to its pre-match state.

Similar to the concept above, utilizing one or more stretch membranes incorporated into an article of wear 12, wherein the stretch membranes change color when stretched may provide a faster color shift but is still based on nanocrystal spacing within chains effected by mechanical forces. In certain embodiments, the technology may be included with certain apparel items so that as the membranes stretch, they change color and then revert back to their natural (or pre-set) color when relaxed. This would give a very dynamic effect and could be tuned to give some indication of how far the garment was stretched (i.e., the amount of force applied to the stretch membranes). When used in conjunction with a material with known elastic properties, one could use a color coding chart to adjust the amount of pressure applied to a certain body segment (e.g., when applying medical stretch tape (used in rehabilitation and injury prevention) such that it does not exceed a predetermined safe pressure limit.

This visual indicator may also be used to indicate how well a garment fits. Because of the dynamic nature of the concept, an athlete may be filmed in motion while wearing the apparel and studied to see how far the bands stretched during dynamic motions. This may indicate that a garment is too restrictive or too loose in certain areas and this information could then be used to custom tailor an article.

Another concept is to use the membranes to give fans a better indication of how fast an athlete is moving. For example, soccer player are beginning to wear jerseys with stretch membranes during games. Membranes incorporating this technology may give spectators and coaches a visual indication if a player is just lightly jogging (where there might be minimal color change) or if the player is in an all-out sprint for the ball (where the color change could be very dramatic based on the greater extension of the limbs).

In certain electronic training programs, colored zones are currently used to describe effort. For example, as illustrated in U.S. Pat. No. 8,200,323, FIG. 8, at a slow jog, a runner's heart rate or pace is described as being in the blue zone, a stronger effort in the green zone up to the aerobic threshold, then the yellow zone in the anaerobic zone, and lastly red, which represents maximum effort. Ideally, there might be apparel, footwear, and accessory products that mimic this color change scheme so that as a runner is increasing effort, some or all of the articles of wear change color to mimic the color zones and also to indicate to other runners the rapidity of their pace.

The effect of this technology is not limited to light in the visible spectrum. As a result, in some embodiments, the bistable medium containing nanocrystal chains may be used in applications to enhance the thermal control of garments and footwear. The concept is take advantage of selective filtering of UV and IR radiation. This has the additional advantage in that it is tunable and reversible.

In certain embodiments, chains of nanocrystals are incorporated in selective areas of garments such as the shoulders, chest, and back area of shirts that have the most exposure to sunlight, as described in U.S. Publication No. 2011-0099680. Some areas such as the shoulders might be tuned to reflect UV light in order to prevent sunburn and overheating. In other examples, a shirt designed for winter use might still have similar reflectivity in the shoulder are while absorbing IR light in the chest and back to enhance warming on sunny by cool winter days.

Another advantage of this concept is that it is reversible so that a garment optimized for winter use, might be transformed and enhanced for summer use at the end of the season. This might be especially useful in rain jackets and shoes which are often used year round. This outcome may be achieved through re-spacing of the nanocrystals within chains to make them more (or less) permeable to a certain wavelength. For example, in the summer, the chains of nanocrystals may be spaced to be far IR permeable and near IR and visible reflective for cooling purposes. In the winter, the chains of nanocrystals may be spaced for far IR reflective and near IR and visible absorbent for heating purposes.

Sweat Triggered Coloring

Another interesting concept is to have the nanocrystal chains encapsulated in a hydrophilic elastomer that would stretch the chains of nanocrystals when in the presence of water. For example, as described in U.S. Publication No. 2011-0099680, as a wearer sweats or generates steam, the garment could change color. In addition to this benefit, the sweat triggering could shift the chains of nanocrystals from passive to IR blocking so that as the wearer warms up, the chains of nanocrystals start to block further heat absorption.

In the following, further examples are described to facilitate the understanding of the invention:

1. An article of wear comprising iron oxide colloidal nanocrystals arranged within chains, wherein the chains of nanocrystals display a color that is determined by a strength of a magnetic field applied to the chains of nanocrystals, wherein the color is maintained when the magnetic field is removed.

2. The article of wear of example 1, wherein the chains of nanocrystals are embedded within a material used to form the article of wear or a transfer medium used to transfer the color to the article of wear.

3. The article of wear of example 2, wherein the material is a film, laminate, yarn, thread, fabric, leather, plastic, or foam.

4. The article of wear of example 2, wherein the transfer medium is a paint, dye, ink, film, gel, silicon, or powder.

5. The article of wear of example 2, wherein the magnetic field is not applied to the chains of nanocrystals until after the article of wear is manufactured.

6. The article of wear of example 5, wherein an energy source is applied to the chains of nanocrystals to soften the material or the transfer medium immediately surrounding the chains of nanocrystals to which energy is applied when the magnetic field is applied to adjust the color displayed by the chains of nanocrystals.

7. The article of wear of example 6, wherein the material or the transfer medium immediately surrounding the chains of nanocrystals to which the energy is applied hardens prior to removal of the magnetic field so that the color displayed by the chains of nanocrystals is maintained.

8. The article of wear of example 1, wherein the article of wear is a shoe or apparel.

9. An article of wear formed of at least one material comprising iron oxide colloidal nanocrystals arranged within chains, wherein the chains of nanocrystals display a color that is determined by a strength of a magnetic field applied to the chains of nanocrystals, wherein the color is maintained when the magnetic field is removed.

10. The article of wear of example 9, wherein the at least one material is a film, laminate, yarn, thread, fabric, leather, plastic, or foam.

11. The article of wear of example 9, wherein the magnetic field is not applied to the chains of nanocrystals until after the article of wear is manufactured.

12. The article of wear of example 11, wherein an energy source is applied to the chains of nanocrystals to soften the at least one material immediately surrounding the chains of nanocrystals to which energy is applied when the magnetic field is applied to adjust the color displayed by the chains.

13. The article of wear of example 12, wherein the at least one material immediately surrounding the chains of nanocrystals to which the energy is applied hardens prior to removal of the magnetic field so that the color displayed by the chains of nanocrystals is maintained.

14. The article of wear of example 9, wherein the article of wear is a shoe or apparel.

15. An article of wear comprising iron oxide colloidal nanocrystals arranged within chains, wherein the chains of nanocrystals display a color that is determined by a spacing between the nanocrystals within each chain, wherein the spacing is adjustable through application of energy and a magnetic field.

16. The article of wear of example 15, wherein the chains of nanocrystals are embedded within a material used to form the article of wear or a transfer medium used to transfer the color to the article of wear.

17. The article of wear of example 16, wherein the material is a film, laminate, yarn, thread, fabric, leather, plastic, or foam.

18. The article of wear of example 16, wherein the transfer medium is a paint, dye, ink, film, gel, silicon, or powder.

19. The article of wear of example 16, wherein the magnetic field is not applied to the chains of nanocrystals until after the article of wear is manufactured.

20. The article of wear of example 19, wherein energy is applied to the chains of nanocrystals to soften the material or the transfer medium immediately surrounding the chains of nanocrystals to which the energy is applied when the magnetic field is applied to adjust the color displayed by the chains of nanocrystals.

21. The article of wear of example 20, wherein the material or the transfer medium immediately surrounding the chains of nanocrystals to which the energy is applied hardens prior to removal of the magnetic field so that the color displayed by the chains of nanocrystals is maintained.

22. The article of wear of example 15, wherein the article of wear is a shoe or apparel.

23. An apparatus for manipulating a color displayed by an article of wear comprising iron oxide colloidal nanocrystals arranged within chains, the apparatus comprising:
(a) a magnetic field source, wherein a strength of a magnetic field generated by the magnetic field source is tunable to control the color displayed by the article of wear; and
(b) an energy source, wherein energy generated by the energy source is applied to at least some of the chains of nanocrystals to soften materials within the article of wear immediately surrounding the chains of nanocrystals to which the energy is applied.

24. The apparatus of example 23, wherein the energy source is removed while the magnetic field is still applied to the article of wear to allow the materials within the article of wear immediately surrounding the chains of nanocrystals to harden and fix a location of the nanocrystals within the chains.

25. The apparatus of example 23, wherein the magnetic field source comprises a set of coils arranged proximate a platform so that the magnetic field is concentrated and oriented substantially perpendicular to the platform.

26. The apparatus of example 23, wherein the magnetic field source comprises a set of coils arranged proximate a metal last so that the magnetic field is concentrated and oriented substantially uniform over a surface of the metal last.

27. The apparatus of example 26, wherein the metal last is a magnetic coil.

28. The apparatus of example 23, wherein the energy source comprises a convection heat source.

29. The apparatus of example 23, wherein the energy source comprises a laser.

30. The apparatus of example 23, wherein the magnetic field is incorporated into a drum of an industrial dryer, and the energy source is heat provided by the industrial dryer.

31. The apparatus of example 23, wherein the article of wear comprises a first layer comprising the chains of nanocrystals and at least one additional layer that does not comprise the chains of nanocrystals, wherein the energy source is a 95 GHz radiation beam that is configured to penetrate the first layer without penetrating the at least one additional layer.

32. The apparatus of example 23, wherein the magnetic field source acts as both the energy source by generating a rapidly fluctuating magnetic field, which creates transient currents in the chains of nanocrystals, and the magnetic field source by switching to a constant magnetic field once the materials within the article of wear immediately surrounding the chains of nanocrystals to which the energy is applied are softened.

33. An apparatus for manipulating a color displayed by an article of wear comprising iron oxide colloidal nanocrystals arranged within chains, the apparatus comprising:
(a) a platform comprising a substantially flat surface having a gap therein, wherein the platform is configured so that at least a portion of the article of wear is positioned adjacent the surface of the platform and the gap therein;
(b) a magnetic field source configured to generate a magnetic field, wherein at least a portion of the magnetic field passes through the gap and is oriented substantially perpendicular to the surface of the platform and the portion of the article of wear positioned proximate the gap, wherein a strength of the magnetic field is tunable to control the color displayed by the portion of the article of wear positioned proximate the gap; and
(c) an energy source configured to generate energy directed into the gap, wherein the energy directed into the gap is configured to be applied to the chains of nanocrystals within the portion of the article of wear positioned proximate the gap to soften materials within the article of wear immediately surrounding the chains of nanocrystals to which the energy is applied.

34. The apparatus of example 33, wherein the energy source is removed while the magnetic field is still applied to the article of wear to allow the materials within the article of wear immediately surrounding the chains of nanocrystals to harden and fix a location of the nanocrystals within the chains.

35. The apparatus of example 33, wherein the article of wear comprises a roll of textile that is unrolled proximate a first end of the platform, positioned adjacent the surface of the platform and the gap therein, and re-rolled proximate a second end of the platform.

36. The apparatus of example 33, wherein the gap is approximately 0.5 inches in width and approximately 8.5 inches in length.

37. The apparatus of example 33, wherein the article of wear comprises a first layer comprising the chains of nanocrystals and at least one additional layer that does not comprise the chains of nanocrystals, wherein the energy source is a 95 GHz radiation beam that is configured to penetrate the first layer without penetrating the at least one additional layer.

38. The apparatus of example 33, wherein the energy source comprises a laser.

39. The apparatus of example 33, wherein the energy source comprises a focused UV lamp.

40. The apparatus of example 33, wherein the magnetic field source acts as both the energy source by generating a rapidly fluctuating magnetic field, which creates transient currents in the chains of nanocrystals, and the magnetic field source by switching to a constant magnetic field once the materials within the article of wear immediately surrounding the chains of nanocrystals to which the energy is applied are softened.

41. An apparatus for manipulating a color displayed by an article of wear comprising iron oxide colloidal nanocrystals arranged within chains, the apparatus comprising:

(a) an activation tunnel comprising a central opening, wherein the central opening is configured so that the article of wear is located within the activation tunnel;

(b) a magnetic field source comprising a plurality of solenoids substantially surrounding the activation tunnel and configured to generate a magnetic field within the central opening of the activation tunnel, wherein a strength of the magnetic field is tunable to control the color displayed by the portion of the article of wear positioned within the activation tunnel; and (c) an energy source configured to generate energy directed into the central opening of the activation tunnel, wherein the energy directed into the central opening of the activation tunnel is configured to be applied to the chains of nanocrystals within the article of wear to soften materials within the article of wear immediately surrounding the chains of nanocrystals to which the energy is applied.

42. The apparatus of example 41, wherein the energy source is removed while the magnetic field is still applied to the article of wear to allow the materials within the article of wear immediately surrounding the chains of nanocrystals to harden and fix a location of the nanocrystals within the chains.

43. The apparatus of example 41, wherein the article of wear comprises a first layer comprising the chains of nanocrystals and at least one additional layer that does not comprise the chains of nanocrystals, wherein the energy source is a 95 GHz radiation beam that is configured to penetrate the first layer without penetrating the at least one additional layer.

44. A method of manipulating a color displayed by an article of wear comprising iron oxide colloidal nanocrystals arranged within chains, the method comprising:

(a) forming the article of wear from at least one raw material, wherein the at least one raw material comprises the chains of nanocrystals;

(b) applying a magnetic field to the at least one raw material;

(c) applying energy to at least some of the chains of nanocrystals to soften materials within the at least one raw material immediately surrounding the chains of nanocrystals to which the energy is applied;

(d) adjusting a strength of the magnetic field to control the color displayed by the at least one raw material;

(e) removing the energy to allow the materials within the at least one raw material immediately surrounding the chains of nanocrystals to harden and fix a location of the nanocrystals within the chains; and (f) removing the magnetic field.

45. The method of example 44, wherein the energy and the magnetic field are applied to the at least one raw material during formation of the article of wear.

46. The method of example 44, wherein the energy and the magnetic field are applied to the at least one raw material prior to formation of the article of wear.

47. The method of example 44, further comprising:
unrolling the at least one raw material proximate a first end of a platform, wherein the platform comprises a substantially flat surface and a gap therein;
positioning an unrolled portion of the at least one raw material adjacent the surface of the platform and the gap therein;
re-rolling the at least one raw material proximate a second end of the platform.

48. The method of example 47, wherein the energy and the magnetic field are applied to a portion of the at least one raw material positioned proximate the gap.

49. The method of example 44, wherein the at least one raw material comprises a yarn or thread, and the method further comprises applying the energy and the magnetic field to the at least one raw material as the at least one raw material is being fed into a weaving loom or knitting machine.

50. A method of manipulating a color displayed by a plurality of articles of wear, each article of wear comprising iron oxide colloidal nanocrystals arranged within chains, the method comprising:

(a) applying a magnetic field to the plurality of articles of wear;

(b) applying energy to at least some of the chains of nanocrystals to soften materials within the plurality of articles of wear immediately surrounding the chains of nanocrystals to which the energy is applied;

(c) adjusting a strength of the magnetic field to control the color displayed by the plurality of articles of wear;

(d) removing the energy to allow the materials within the plurality of articles of wear immediately surrounding the chains of nanocrystals to harden and fix a location of the nanocrystals within the chains; and (e) removing the magnetic field.

51. The method of example 50, further comprising:
inserting the plurality of articles of wear within a central opening of an activation tunnel;
applying the magnetic field via a plurality of solenoids substantially surrounding the activation tunnel.

52. The method of example 50, further comprising inserting the plurality of articles of wear within a drum of an industrial dryer.

53. A method of manipulating a color displayed by an article of wear comprising iron oxide colloidal nanocrystals arranged within chains, the method comprising:

(a) applying a magnetic field to the article of wear;

(b) applying energy to at least some of the chains of nanocrystals to soften materials within the article of wear immediately surrounding the chains of nanocrystals to which the energy is applied;

(c) adjusting a strength of the magnetic field to control the color displayed by the article of wear;

(d) removing the energy to allow the materials within the article of wear immediately surrounding the chains of nanocrystals to harden and fix a location of the nanocrystals within the chains; and (e) removing the magnetic field.

54. The method of example 53, further comprising:
placing the article of wear on a platform, wherein the magnetic field is concentrated and oriented perpendicular to the platform; and
applying the energy via a laser controlled by a numerical control device.

55. The method of example 53, further comprising placing the article of wear on a metal shoe last, wherein the magnetic field is concentrated and oriented perpendicular to a surface of the metal shoe last.

56. The method of example 53, wherein the article of wear comprises a first layer comprising the chains of nanocrystals and at least one additional layer that does not comprise the chains of nanocrystals, further comprising applying the energy via a 95 GHz radiation beam that penetrates the first layer without penetrating the at least one additional layer.

57. A method of manipulating a color displayed by an article of wear comprising iron oxide colloidal nanocrystals arranged within chains embedded within a material or a transfer medium based on performance achievements, the method comprising:
- retrieving an achievement value of a performance parameter;
- retrieving the material or transfer medium information;
- determining a level of achievement based on the achievement value;
- determining a color associated with the level of achievement;
- determining a magnetic field strength required to achieve the color associated with the level of achievement within the material or the transfer medium; and
- transmitting the magnetic field strength to a tuning device.

58. The method of example 57, further comprising:
- retrieving a location of one or more color zones within the article of wear;
- transmitting the location of one or more color zones to a user interface;
- retrieving a selection of one or more color zone locations; and
- transmitting the selection of one or more color zone locations to the tuning device for selective application of energy from an energy source.

59. A retail system for manipulating a color displayed by an article of wear comprising iron oxide colloidal nanocrystals arranged within chains embedded within a material or a transfer medium based on performance achievements, the retail system comprising:
- a tuning device comprising:
  - a magnetic field source, wherein a strength of a magnetic field generated by the magnetic field source is tunable to control the color displayed by the article of wear; and
  - an energy source, wherein energy generated by the energy source is applied to at least some of the chains of nanocrystals to soften the material or transfer medium immediately surrounding the chains of nanocrystals to which the energy is applied;
- one or more processors in communication with the tuning device; and
- memory including instructions that, when executed by the one or more processors, cause the one or more processors to:
retrieve an achievement value of a performance parameter;
retrieve the material or transfer medium information;
determine a level of achievement based on the achievement value;
determine a color associated with the level of achievement;
  - determine a magnetic field strength required to achieve the color associated with the level of achievement within the material or the transfer medium; and
transmit the magnetic field strength to the tuning device.

60. The retail system of example 59, wherein the memory further includes instructions that, when executed by the one or more processors, cause the one or more processors to:
- retrieve a location of one or more color zones within the article of wear;
- transmit the location of one or more color zones to a user interface;
- retrieve a selection of one or more color zone locations; and
- transmit the selection of one or more color zone locations to the tuning device for selective application of energy from the energy source.

61. A method of manipulating a color displayed by an article of wear comprising iron oxide colloidal nanocrystals arranged within chains embedded within a material or a transfer medium based customization preferences, the method comprising:
- retrieving the material or transfer medium information;
- retrieving a list of available colors;
- transmitting the list of available colors to a user interface;
- retrieving a selection of one or more colors;
- determining a magnetic field strength required to achieve the selection of one or more colors within the material or the transfer medium; and
- transmitting the magnetic field strength to a tuning device.

62. The method of example 61, further comprising:
- retrieving a location of one or more color zones within the article of wear;
- transmitting the location of one or more color zones to the user interface;
- retrieving a selection of one or more color zone locations; and
- transmitting the selection of one or more color zone locations to the tuning device for selective application of energy from an energy source.

63. A retail system for manipulating a color displayed by an article of wear comprising iron oxide colloidal nanocrystals arranged within chains embedded within a material or a transfer medium based on performance achievements, the retail system comprising:
- a tuning device comprising:
  - a magnetic field source, wherein a strength of a magnetic field generated by the magnetic field source is tunable to control the color displayed by the article of wear; and
  - an energy source, wherein energy generated by the energy source is applied to at least some of the chains of nanocrystals to soften the material or transfer medium immediately surrounding the chains of nanocrystals to which the energy is applied;
- one or more processors in communication with the tuning device; and
- memory including instructions that, when executed by the one or more processors, cause the one or more processors to:
retrieve the material or transfer medium information;
retrieve a list of available colors;
transmit the list of available colors to a user interface;
retrieve a selection of one or more colors;
  - determine a magnetic field strength required to achieve the selection of one or more colors within the material or the transfer medium; and
transmit the magnetic field strength to the tuning device.

64. The retail system of example 63, wherein the memory further includes instructions that, when executed by the one or more processors, cause the one or more processors to:
- retrieve a location of one or more color zones within the article of wear;
- transmit the location of one or more color zones to the user interface;
- retrieve a selection of one or more color zone locations; and
- transmit the selection of one or more color zone locations to the tuning device for selective application of energy from the energy source.

65. An article comprising iron oxide colloidal nanocrystals arranged within chains,
- wherein the chains of nanocrystals are embedded within a material used to form the article or a transfer medium used to transfer a color to the article, wherein the material or transfer medium comprises elastic properties that allow the nanocrystals to display a temporary color determined by the strength of an external force applied to the article, and the material or transfer medium comprises memory properties that cause the displayed temporary color to dissipate when the external force is removed, wherein the dissipation of the displayed temporary color is sufficiently slow as to be visually observable by an average observer's unaided eye.

66. The article of example 65, wherein the external force is application of a magnetic field to the chains of nanocrystals.

67. The article of example 65, wherein the external force is a physical force applied to the material or transfer medium, which cause a localized deformation of the material or transfer medium.

68. The article of example 65, wherein the article is a club face of a golf club.

69. The article of example 65, wherein the article is one or more stretch membranes incorporated into an article of wear.

70. The article of example 69, wherein the color displayed by the one or more stretch membranes corresponds to an amount of force applied to the one or more stretch membranes.

71. A method of manipulating a color displayed by a transfer medium or substrate comprising iron oxide colloidal nanocrystals arranged within chains, wherein each chain of nanocrystals is encapsulated, the method comprising:
 (a) applying a magnetic field to the transfer medium or substrate to control the color displayed by the transfer medium or substrate; and
 (b) applying energy to at least some of the chains of nanocrystals at a level that destroys the encapsulation surrounding the chains of nanocrystals to which the energy is applied.

72. The method of example 71, further comprising applying the energy to at least some of the chains of nanocrystals to soften the transfer medium or substrate immediately surrounding the chains of nanocrystals to which the energy is applied prior to applying the energy to at least some of the chains of nanocrystals at the level that destroys the encapsulation surrounding the chains of nanocrystals to which the energy is applied.

73. The method of example 71, wherein the color displayed by the transfer medium or substrate is manipulated prior to application to an article of wear.

74. The method of example 71, wherein the color displayed by the transfer medium or substrate is manipulated after application to an article of wear.

75. A method of manipulating a color displayed by an article of wear comprising iron oxide colloidal nanocrystals arranged within chains, wherein each chain of nanocrystals is encapsulated, the method comprising:
 (a) forming the article of wear from at least one raw material, wherein the at least one raw material comprises the chains of nanocrystals;
 (b) applying a magnetic field to the at least one raw material;
 (c) applying energy to at least some of the chains of nanocrystals to soften materials within the at least one raw material immediately surrounding the chains of nanocrystals to which the energy is applied;
 (d) adjusting a strength of the magnetic field to control the color displayed by the at least one raw material;
 (e) applying additional energy to at least some of the chains of nanocrystals at a level that destroys the encapsulation surrounding the chains of nanocrystals to which the energy is applied.

76. The method of example 75, wherein the color displayed by the at least one raw material is manipulated prior to forming the article of wear.

77. The method of example 75, wherein the color displayed by the transfer medium or substrate is manipulated while forming the article of wear.

78. The method of example 75, wherein the color displayed by the transfer medium or substrate is manipulated after forming the article of wear.

79. The method of example 75, further comprising:
 unrolling the at least one raw material proximate a first end of a platform, wherein the platform comprises a substantially flat surface and a gap therein;
 positioning an unrolled portion of the at least one raw material adjacent the surface of the platform and the gap therein;
 re-rolling the at least one raw material proximate a second end of the platform.

80. The method of example 79, wherein the energy and the magnetic field are applied to a portion of the at least one raw material positioned proximate the gap.

81. The method of example 75, wherein the at least one raw material comprises a yarn or thread, and the method further comprises applying the energy and the magnetic field to the at least one raw material as the at least one raw material is being fed into a weaving loom or knitting machine.

82. A method of manipulating a color displayed by a plurality of articles of wear, each article of wear comprising iron oxide colloidal nanocrystals arranged within chains, wherein each chain of nanocrystals is encapsulated, the method comprising:
 (a) applying a magnetic field to the plurality of articles of wear;
 (b) applying energy to at least some of the chains of nanocrystals to soften materials within the plurality of articles of wear immediately surrounding the chains of nanocrystals to which the energy is applied;
 (c) adjusting a strength of the magnetic field to control the color displayed by the plurality of articles of wear; and
 (d) applying additional energy to at least some of the chains of nanocrystals at a level that destroys the encapsulation surrounding the chains of nanocrystals to which the energy is applied.

83. The method of example 82, further comprising:
 inserting the plurality of articles of wear within a central opening of an activation tunnel;
 applying the magnetic field via a plurality of solenoids substantially surrounding the activation tunnel.

84. The method of example 82, further comprising inserting the plurality of articles of wear within a drum of an industrial dryer.

85. A method of manipulating a color displayed by an article of wear comprising iron oxide colloidal nanocrystals arranged within chains, wherein each chain of nanocrystals is encapsulated, the method comprising:
 (a) applying a magnetic field to the article of wear;
 (b) applying energy to at least some of the chains of nanocrystals to soften materials within the article of wear immediately surrounding the chains of nanocrystals to which the energy is applied;
 (c) adjusting a strength of the magnetic field to control the color displayed by the article of wear;

(d) applying additional energy to at least some of the chains of nanocrystals at a level that destroys the encapsulation surrounding the chains of nanocrystals to which the energy is applied.

86. The method of example 85, further comprising:

placing the article of wear on a platform, wherein the magnetic field is concentrated and oriented perpendicular to the platform; and applying the energy via a laser controlled by a numerical control device.

87. The method of example 85, further comprising placing the article of wear on a metal shoe last, wherein the magnetic field is concentrated and oriented perpendicular to a surface of the metal shoe last.

88. The method of example 85, wherein the article of wear comprises a first layer comprising the chains of nanocrystals and at least one additional layer that does not comprise the chains of nanocrystals, further comprising applying the energy via a 95 GHz radiation beam that penetrates the first layer without penetrating the at least one additional layer.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What which is claimed is:

1. An article comprising iron oxide colloidal nanocrystals arranged within chains,
    wherein the chains of nanocrystals are embedded within a material used to form the article or a transfer medium used to transfer a color to the article,
    wherein the material or transfer medium comprises elastic properties that allow the nanocrystals to display a temporary color determined by the strength of an external force applied to the article, and the material or transfer medium comprises memory properties that cause the displayed temporary color to dissipate when the external force is removed,
    wherein the dissipation of the displayed temporary color is observable in the ultraviolet spectrum.

2. The article of claim 1, wherein the external force is application of a magnetic field to the chains of nanocrystals.

3. The article of claim 1, wherein the external force is a physical force applied to the material or transfer medium, which cause a localized deformation of the material or transfer medium.

4. The article of claim 1, wherein the article is a club face of a golf club.

5. The article of claim 1, wherein the article is one or more stretch membranes incorporated into an article of wear.

6. The article of claim 5, wherein the color displayed by the one or more stretch membranes corresponds to an amount of force applied to the one or more stretch membranes.

7. An article comprising iron oxide colloidal nanocrystals arranged within chains,
    wherein the chains of nanocrystals are embedded within a material used to form the article or a transfer medium used to transfer a color to the article,
    wherein the material or transfer medium comprises elastic properties that allow the nanocrystals to display a temporary color determined by the strength of an external force applied to the article, and the material or transfer medium comprises memory properties that cause the displayed temporary color to dissipate when the external force is removed,
    wherein the dissipation of the displayed temporary color is observable in the infrared spectrum.

8. The article of claim 7, wherein the external force is application of a magnetic field to the chains of nanocrystals.

9. The article of claim 7, wherein the external force is a physical force applied to the material or transfer medium, which cause a localized deformation of the material or transfer medium.

10. The article of claim 7, wherein the article is a club face of a golf club.

11. The article of claim 7, wherein the article is one or more stretch membranes incorporated into an article of wear.

12. The article of claim 11, wherein the color displayed by the one or more stretch membranes corresponds to an amount of force applied to the one or more stretch membranes.

13. An article comprising iron oxide colloidal nanocrystals arranged within chains,
    wherein the chains of nanocrystals are embedded within a material used to form the article or a transfer medium used to transfer a color to the article,
    wherein the material or transfer medium comprises elastic properties that allow the nanocrystals to display a temporary color determined by the strength of an external force applied to the article, and the material or transfer medium comprises memory properties that cause the displayed temporary color to dissipate when the external force is removed,
    wherein the dissipation of the displayed temporary color is observable in at least one of the visible, infrared, and ultraviolet spectrums.

14. The article of claim 13, wherein the external force is application of a magnetic field to the chains of nanocrystals.

15. The article of claim 13, wherein the external force is a physical force applied to the material or transfer medium, which cause a localized deformation of the material or transfer medium.

16. The article of claim 13, wherein the article is a club face of a golf club.

17. The article of claim 13, wherein the article is one or more stretch membranes incorporated into an article of wear.

18. The article of claim 17, wherein the color displayed by the one or more stretch membranes corresponds to an amount of force applied to the one or more stretch membranes.

* * * * *